United States Patent
Yamamoto et al.

(10) Patent No.: US 6,727,315 B2
(45) Date of Patent: Apr. 27, 2004

(54) COPOLYMER FOR CEMENT ADMIXTURES AND ITS PRODUCTION PROCESS AND USE

(76) Inventors: Masaya Yamamoto, 1-21 C-301, Shishigaya, Tsurumi-ku, Yokohama-shi, Kanagawa, 230-0073 (JP); Toru Uno, 1-40-11 A-102, Shishigaya, Tsurumi-ku, Yokohama-shi, Kanagawa, 230-0073 (JP); Yoshiyuki Onda, 2-61-11, Ikebukuro, Toshima-ku, Tokyo, 171-0014 (JP); Hiromichi Tanaka, 6-20-14, Higashitoyonaka-cho, Toyonaka-shi, Osaka, 560-0003 (JP); Akihiko Yamashita, 9-10-107, Takashiro-cho, Suita-shi, Osaka, 564-0024 (JP); Tsuyoshi Hirata, 3-4-3-619, Manabigaoka, Tarumi-ku, Kobe-shi, Hyogo, 655-0004 (JP); Naoko Hirano, 20-13-207, Shimoohichihigashimachi, Nishinomiya-shi, Hyogo, 663-8004 (JP)

( * ) Notice: Subject to any disclaimer, the term of this patent is extended or adjusted under 35 U.S.C. 154(b) by 0 days.

(21) Appl. No.: 10/160,757

(22) Filed: Jun. 1, 2002

(65) Prior Publication Data

US 2003/0125492 A1 Jul. 3, 2003

Related U.S. Application Data

(62) Division of application No. 09/710,446, filed on Nov. 10, 2000, now abandoned.

(30) Foreign Application Priority Data

Nov. 29, 1999 (JP) ............................................ 11-338205

(51) Int. Cl.$^7$ ............................................... C08F 16/02
(52) U.S. Cl. ............................. 524/558; 524/556; 524/3
(58) Field of Search ............................. 524/3, 556, 558

(56) References Cited

U.S. PATENT DOCUMENTS

| | | | |
|---|---|---|---|
| 5,661,206 A | * | 8/1997 | Tanaka et al. ............... 524/378 |
| 5,798,425 A | | 8/1998 | Albrecht et al. |
| 5,912,284 A | * | 6/1999 | Hirata et al. .................... 524/5 |

FOREIGN PATENT DOCUMENTS

EP  0 537 872 A1  4/1993

(List continued on next page.)

*Primary Examiner*—David W. Wu
*Assistant Examiner*—Satya Sastri

(57) ABSTRACT

The present invention provides: a copolymer for cement admixtures which displays high dispersibility with a small adding amount and excellent dispersibility particularly even in a high water reducing ratio area, a cement admixture utilizing the copolymer, and a cement composition, and further, a production process for the copolymer. The copolymer for cement admixtures comprises: constitutional unit (I) derived from unsaturated polyalkylene glycol ether monomer (a) having an alkenyl group having 5 carbon atoms and an oxyalkylene group having 2 to 18 carbon atoms with an average addition number of moles of the oxyalkylene groups to be in the range of 10 to 300; and constitutional unit (II) derived from unsaturated monocarboxylic acid monomer (b). The cement admixture includes the copolymer for cement admixtures as an essential component, and may further include a defoaming agent. The cement composition includes the copolymer for cement admixtures, and cement as essential components. The production process for the copolymer comprises: copolymerizing comonomers including unsaturated polyalkylene glycol ether monomer (a) and unsaturated monocarboxylic monomer (b) as essential components by use of a chain-transfer agent, and/or adjusting pH of a resultant reaction mixture to not less than 5 after the copolymerization.

11 Claims, 12 Drawing Sheets

FOREIGN PATENT DOCUMENTS

| | | |
|---|---|---|
| EP | 0 850 894 A1 | 7/1998 |
| EP | 0 850 895 A1 | 7/1998 |
| JP | 62-68806 | 3/1987 |
| JP | 62-68806 A | 3/1987 |
| JP | 62068806 A | 3/1987 |
| JP | 5-213651 A | 8/1993 |
| JP | 8-283350 A | 10/1996 |
| JP | 10-194808 A | 7/1998 |
| JP | 10-236857 A | 9/1998 |
| JP | 10-236858 A | 9/1998 |
| JP | 10-236859 A | 9/1998 |
| JP | 11-106247 A | 4/1999 |
| JP | 2000-233957 A | 8/2000 |
| WO | WO 0048961 A1 | 8/2000 |

* cited by examiner

COPOLYMER FOR CEMENT ADMIXTURES AND ITS PRODUCTION PROCESS AND USE

This application claims the benefit of 35 U.S.A. §120 of U.S. patent application Ser. No. 09/710,446 filed Nov. 10, 2000 now abandoned.

BACKGROUND OF THE INVENTION

A. Technical Field

The present invention relates to a copolymer for cement admixtures, a cement admixture utilizing the copolymer, and a cement composition, and further, a production process for the copolymer.

B. Background Art

In the recent concrete industry, the improvement of durability and strength of concrete structures is strongly desired, and to reduce the amount of unit water is an important object. Especially, as to polycarboxylic acid-based cement dispersants, many proposals were made, because the polycarboxylic acid-based cement dispersants exhibit higher water reducibility than conventional cement dispersants such as naphthalene-based ones. For example, JP-B-04-68323 proposes polymers as formed from unsaturated carboxylic acid monomer (a) and unsaturated alcohol monomer (b) with a specific combining ratio. However, it is insufficient in capacities as cement dispersants. On the other hand, JP-A-10-236858 proposes a cement dispersant including a copolymer as formed from unsaturated polyalkylene glycol ether monomer (I) and maleic acid monomer (II) with a specific combining ratio. However, much amount of the dispersant is necessary to obtain a sufficient dispersibility because of copolymerizability of monomer (I) and monomer (II), and the dispersant having a level that cannot satisfy the dispersibility particularly in a high water reducing ratio area in the existing circumstances.

SUMMARY OF THE INVENTION

A. Object of the Invention

Therefore, an object of the present invention is to provide: a copolymer for cement admixtures which displays high dispersibility with a small adding amount and excellent dispersibility particularly even in a high water reducing ratio area, a production process therefor, a cement admixture utilizing the copolymer, and a cement composition.

B. Disclosure of the Invention

The present inventors diligently studied and, as a result, found that a copolymer, as obtained by using a specific unsaturated polyalkylene glycol ether monomer having a limited polyalkylene glycol chain length and an unsaturated monocarboxylic acid monomer, and polymerizing these monomers under a specific condition, displays high dispersibility with a small adding amount. In addition, they found that: there is a correlation between a state of the motion of the copolymer molecule and a capacity as a cement admixture, and high dispersibility is displayed if a spin-spin relaxation time ($T_2$) of specific signals with $^1$H-NMR is in a constant range. Then, they completed the present invention on the basis of these findings.

That is to say, copolymer (A) for cement admixtures, according to the present invention, comprises constitutional unit (I) derived from unsaturated polyalkylene glycol ether monomer (a) and constitutional unit (II) derived from unsaturated monocarboxylic acid monomer (b) as essential constitutional units, with the copolymer being characterized in that: unsaturated polyalkylene glycol ether monomer (a) has an alkenyl group having 5 carbon atoms and an oxyalkylene group having 2 to 18 carbon atoms with an average addition number of moles of the oxyalkylene groups to be in the range of 10 to 300.

In addition, copolymer (A') for cement admixtures, according to the present invention, has: a weight-average molecular weight of not less than 10,000; respective signals detected at the chemical shifts of 0.6 to 1.0 ppm, 1.2 to 1.8 ppm, 1.8 to 2.4 ppm and 3.2 to 3.8 ppm with $^1$H-NMR; respective signals detected at the chemical shifts of 20.0 to 30.0 ppm, 30.0 to 50.0 ppm, 58.0 to 62.0 ppm and 60.0 to 80.0 ppm with $^{13}$C-NMR; and a spin-spin relaxation time ($T_2$) of 1 msec to 50 msec as to the signal observed at 1.2 to 1.8 ppm with $^1$H-NMR and/or a spin-spin relaxation time ($T_2$) of 1 msec to 90 msec as to the signal observed at 1.8 to 2.4 ppm with $^1$H-NMR, and unsaturated polyalkylene glycol ether monomer (a) having an alkenyl group having 5 carbon atoms coexists.

A cement admixture, according to the present invention, includes the copolymer for cement admixtures according to the present invention, as an essential component, and may further include a defoaming agent.

A cement composition, according to the present invention, includes the copolymer for cement admixtures according to the present invention, and cement as essential components.

A production process for a copolymer for cement admixtures, according to the present invention, comprises copolymerizing comonomers including unsaturated polyalkylene glycol ether monomer (a) and unsaturated monocarboxylic acid monomer (b) as essential components, with the process being characterized in that: unsaturated polyalkylene glycol ether monomer (a) as used is a compound having an alkenyl group having 5 carbon atoms and an oxyalkylene group having 2 to 18 carbon atoms with an average addition number of moles of the oxyalkylene groups to be in the range of 10 to 300; and a chain-transfer agent is used when copolymerizing the comonomers and/or pH of a resultant reaction mixture after copolymerizing the comonomers is adjusted to not less than 5.

These and other objects and the advantages of the present invention will be more fully apparent from the following detailed disclosure.

DETAILED DESCRIPTION OF THE INVENTION

Figure 1:
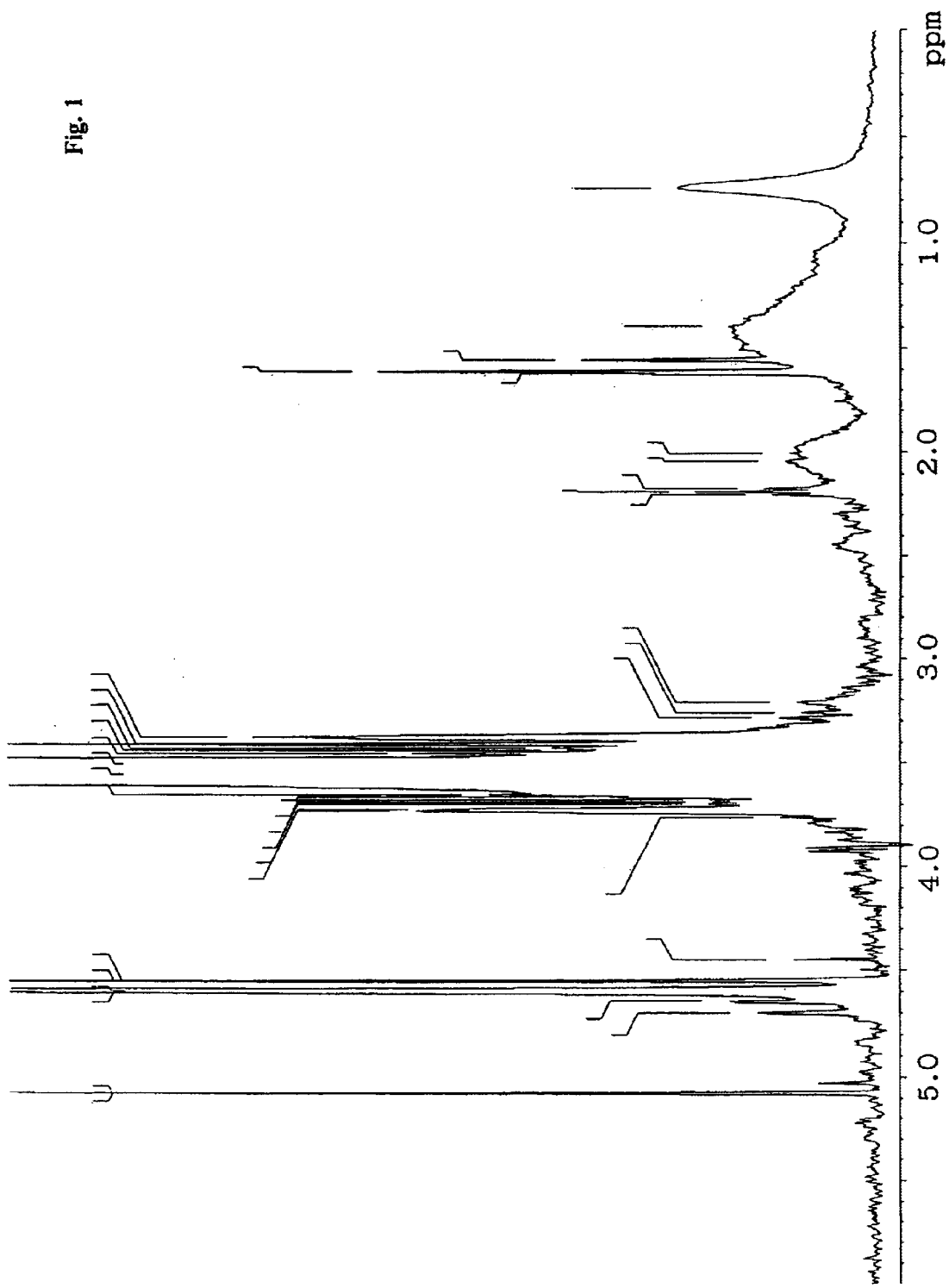
FIG. 1 is a $^1$H-NMR spectral chart of copolymer (1) according to the present invention for cement admixtures.

Hereinafter, first copolymer (A) for cement admixtures, according to the present invention, is described.

First copolymer (A) for cement admixtures, according to the present invention, is a copolymer having constitutional unit (I) derived from unsaturated polyalkylene glycol ether monomer (a) and constitutional unit (II) derived from unsaturated monocarboxylic acid monomer (b) as essential constitutional units. Copolymer (A) may further include constitutional unit (III) derived from a copolymerizable monomer (c) with monomer (a) and/or monomer (b) as mentioned below. It is preferable that copolymer (A) may further include a constitutional unit derived from an unsaturated dicarboxylic acid monomer as monomer (c) because of adjusting the molecular weight easily when preparing the polymer.

The ratio between the respective constitutional units composing copolymer (A) is not especially limited if constitutional unit (I) and constitutional unit (II) are essential. This ratio is fitly in the range of (1 to 99)/(1 to 99)/(0 to 70) (weight %) as (I)/(II)/(III), but such a ratio is preferably in the range of (50 to 99)/(1 to 50)/(0 to 49) (weight %), more preferably in the range of (55 to 98)/(2 to 45)/(0 to 40) (weight %), still more preferably in the range of (60 to 97)/(3 to 40)/(0 to 30) (weight %), (wherein the entirety of (I), (II) and (III) is 100 weight %).

Especially, it is preferable that the ratio of (I) and (II) by mole is: (I)<(II). In case where the molar amount of (II) is not more than the molar amount of (I), it is not preferable because the dispersibility to cement becomes low. The ratio of (I) and (II) by mole is: more preferably (I)/(II)≦0.95, still more preferably (I)/(II)≦0.90, particularly preferably (I)/(II)≦0.85, most preferably (I)/(II)≦0.80.

Copolymer (A), for example, can be produced by copolymerizing comonomers which include monomer (a) and monomer (b) as essential components. The comonomers may further include monomer (c) as mentioned below.

It is preferable that the ratio of monomer (a) and monomer (b) by weight is: monomer (b)/(monomer (a)+monomer (b))×100≧5.8. In case where the ratio is outside the above range, it is not preferable because the polymerization ratio of monomer (a) and dispersibility of the copolymer for cement admixtures to cement after the polymerization become low.

Unsaturated polyalkylene glycol ether monomer (a) has an alkenyl group having 5 carbon atoms and an oxyalkylene group having 2 to 18 carbon atoms with an average addition number of moles of the oxyalkylene groups to be in the range of 10 to 300. Incidentally, monomer (a) may be used either alone respectively or in combinations with each other.

Examples of unsaturated polyalkylene glycol ether monomer (a) include compounds obtained by adding 10 to 300 moles of alkylene oxide to an unsaturated alcohol such as 3-methyl-3-buten-1-ol, 3-methyl-2-buten-1-ol, 2-methyl-3-buten-2-ol, 2-methyl-2-buten-1-ol, and 2-methyl-3-buten-1-ol. These can be used either alone respectively or in combinations with each other. Particularly, a compound obtained by using 3-methyl-3-buten-1-ol is preferable as monomer (a).

Incidentally, examples of the alkylene oxide include adducts of any two or more alkylene oxides selected from the group consisting of ethylene oxide, propylene oxide, butylene oxide and styrene oxide. In this case, any of random addition, block addition, alternating addition and so on may be used. In addition, the terminal of the alkylene oxide added to the unsaturated alcohol may be either hydrogen or a hydrocarbon group having 1 to 30 carbon atoms. Examples of the hydrocarbon group having 1 to 30 carbon atoms include an alkyl group having 1 to 30 carbon atoms (an aliphatic alkyl group or an alicyclic alkyl group), an aromatic group having 6 to 30 carbon atoms having a benzene ring such as a phenyl group, an alkylphenyl group, a phenylalkyl group, a phenyl group substituted by an (alkyl) phenyl group, and a naphthyl group.

Examples of the alkenyl group having 5 carbon atoms include 3-methyl-3-butenyl group, 3-methyl-2-butenyl group, 2-methyl-3-butenyl group, 2-methyl-2-butenyl group and 1,1-dimethyl-2-propenyl group.

It is important that the average addition number of moles of the oxyalkylene groups is in the range of 10 to 300. Hydrophilicity becomes low according to decreasing this average addition number of moles, and on the other hand, reactivity becomes low according to increasing this average addition number of moles. Particularly, the number is preferably in the range of 15 to 300, more preferably 20 to 300, still more preferably 20 to 200, particularly 25 to 200. In case where this average addition number of moles is about 5 mole or less, it is not preferable because dispersibility becomes extremely low.

It is important that the number of the carbon atoms of oxyalkylene group is in the range of 2 to 18. Particularly, the number is preferably in the range of 2 to 8, more preferably 2 to 4.

Incidentally, when only one kind of monomer (a) is used for introducing constitutional unit (I), it is preferable for obtaining the hydrophilicity-hydrophobicity balance that an oxyethylene group is included in the oxyalkylene groups as an essential component, and further that the oxyethylene group comprises 50 mol % or more of the oxyalkylene groups. On the other hand, when two or more kinds of monomers (a) are used for introducing constitutional units (I), it is preferable that either one monomer (a) comprises an oxyethylene group included in the oxyalkylene groups as an essential component.

Examples of unsaturated polyalkylene glycol ether monomer (a) like this include polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl) ether, polyethylene polypropylene glycol mono(3-methyl-3-butenyl) ether, methoxypolyethylene glycol mono(3-methyl-3-butenyl) ether, ethoxypolyethylene glycol mono(3-methyl-3-butenyl) ether, 1-propoxypolyethylene glycol mono(3-methyl-3-butenyl) ether, cyclohexyloxypolyethylene glycol mono (3-methyl-3-butenyl) ether, 1-ocyloxypolyethylene glycol mono(3-methyl-3-butenyl) ether, nonylalkoxypolyethylene glycol mono(3-methyl-3-butenyl) ether, laurylalkoxypolyethylene glycol mono(3-methyl-3-butenyl) ether, stearylalkoxypolyethylene glycol mono(3-methyl-3-butenyl) ether, phenoxypolyethylene glycol mono(3-methyl-3-butenyl) ether, and naphthoxypolyethylene glycol mono(3-methyl-3-butenyl) ether.

It is preferable that unsaturated monocarboxylic monomer (b) is a (meth)acrylic acid monomer. Examples thereof include acrylic acid; methacrylic acid; crotonic acid; and their monovalent metal salts, divalent metal salts, ammonium salts, and organic amine salts. (Meth)acrylic acid and/or their salts are preferable because of copolymerizability. Especially, acrylic acid and/or its salts are more preferable. In addition, these monomers (b) can be used in combinations with each other.

Examples of such copolymerizable monomer (c) with monomer (a) and/or monomer (b) include: unsaturated dicarboxylic acid monomers, such as maleic acid, maleic anhydride, fumaric acid, itaconic acid, and citraconic acid, and their monovalent metal salts, divalent metal salts, ammonium salts, and organic amine salts; half esters and diesters of the above-mentioned unsaturated dicarboxylic acid monomers with alcohols having 1 to 30 carbon atoms; half amides and diamides of the above-mentioned unsaturated dicarboxylic acid monomers with amines having 1 to 30 carbon atoms; half esters and diesters of the above-mentioned unsaturated dicarboxylic acid monomers with alkyl (poly)alkylene glycols as obtained by adding 1 to 500 mols of alkylene oxides with 2 to 18 carbon atoms to the above-mentioned alcohols or amines; half esters and diesters of the above-mentioned unsaturated dicarboxylic acid monomers with glycols having 2 to 18 carbon atoms or with polyalkylene glycols of 2 to 500 in molar number of addition of the foregoing glycols; esters of unsaturated monocarboxylic acids with alcohols having 1 to 30 carbon atoms, such as methyl (meth)acrylate, ethyl (meth)acrylate, propyl (meth)acrylate, glycidyl (meth)acrylate, methyl crotonate, ethyl crotonate, and propyl crotonate; esters of unsaturated monocarboxylic acids such as (meth)acrylic acid with alkoxy (poly)alkylene glycols as obtained by adding 1 to 500 mols of alkylene oxides with 2 to 18 carbon atoms to alcohols having 1 to 30 carbon atoms; adducts of 1 to 500 mols of alkylene oxides with 2 to 18 carbon atoms to the unsaturated monocarboxylic acids such as (meth)acrylic acid, such as (poly)ethylene glycol monomethacrylate, (poly)propylene glycol monomethacrylate and (poly) butylene glycol monomethacrylate; half amides of maleamic acid with glycols having 2 to 18 carbon atoms or polyalkylene glycols of 2 to 500 in molar number of addition of the foregoing glycols; (poly)alkylene glycol di(meth)acrylates such as triethylene glycol di(meth)acrylate, (poly)ethylene glycol di(meth)acrylate, polypropylene glycol di(meth) acrylate, and (poly)ethylene glycol (poly)propylene glycol di(meth)acrylate; difunctional (meth)acrylates such as hexanediol di(meth)acrylate, trimethylolpropane tri(meth) acrylate, and trimethylolpropane di(meth)acrylate; (poly) alkylene glycol dimaleates such as triethylene glycol dimaleate and polyethylene glycol dimaleate; unsaturated sulfonic acids, such as vinylsulfonate, (meth)allylsulfonate, 2-(meth)acryloxyethylsulfonate, 3-(meth) acryloxypropylsulfonate, 3-(meth)acryloxy-2-hydroxypropylsulfonate, 3-(meth)acryloxy-2-hydroxypropylsulfophenyl ether, 3-( meth)acryloxy-2-hydroxypropyloxysulfobenzoate, 4-(meth) acryloxybutylsulfonate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; amides of the unsaturated monocarboxylic acids with amines having 1 to 30 carbon atoms, such as methyl(meth) acrylamide; vinyl aromatic compounds such as styrene, a-methylstyrene, vinyltoluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth) acrylamide, (meth)acrylalkylamide, N-methylol(meth) acrylamide, and N,N-dimethyl(meth)acrylamide; unsaturated cyanes such as (meth)acrylonitrile and α-chloroacrylonitrile; unsaturated esters such as vinyl acetate and vinyl propionate; unsaturated amines such as aminoethyl (meth)acrylate, methylaminoethyl (meth) acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth) allyl ether; unsaturated amino compounds such as dimethylaminoethyl (meth)acrylate; vinyl ethers or allyl ethers, such as methoxypolyethylene glycol monovinyl ether, polyethylene glycol monovinyl ether, methoxypolyethylene glycol mono(meth)allyl ether, and polyethylene glycol mono(meth) allyl ether; and siloxane derivatives such as polydimethylsiloxanepropylaminomaleamic acid, polydimethylsiloxaneaminopropylenearrinomaleamic acid, polydimethylsiloxanebis(propylaminomaleamic acid), polydimethylsiloxanebis(dipropyleneaminomaleamic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate). These may be used either alone respectively or in combinations of two or more thereof. Among these, the unsaturated dicarboxylic acid monomers, such as maleic acid, maleic anhydride, fumaric acid, itaconic acid, citraconic acid, and/ or their salts are preferably used. Particularly, the α,β-unsaturated dicarboxylic acid monomers, such as maleic acid, maleic anhydride, fumaric acid, citraconic acid, and/or their salts are more preferably used.

It is preferable that copolymer (A) has a spin-spin relaxation time ($T_2$) of 1 msec to 50 msec as to the signal observed at 1.2 to 1.8 ppm with $^1$H-NMR and/or a spin-spin relaxation time ($T_2$) of 1 msec to 90 msec as to the signal observed at 1.8 to 2.4 ppm with $^1$H-NMR. $T_2$ as to the signal observed at 1.2 to 1.8 ppm is preferably in the range of 2 msec to 48 msec, more preferably 5 msec to 45 msec. In addition, $T_2$ as to the signal observed at 1.8 to 2.4 ppm is preferably in the range of 2 msec to 90 msec, more preferably 5 msec to 90 msec. Copolymer (A) having $T_2$ in such range displays high dispersibility as a cement admixture. In case where $T_2$ as to the respective signals are less than 1 msec, the capacity of copolymer (A) as a cement admixture becomes low because an interaction between a carboxylic group of copolymer (A) and water becomes low and the capacity to move copolymer (A) becomes low. Incidentally, a nuclear magnetic resonance apparatus (400 MHz) is used to measure the spin-spin relaxation time ($T_2$), and the measuring method is carried out by measuring hydrogen nucleus according to CPMG method.

Hereinafter, a production process for copolymer (A) according to the present invention is described. As to a process in order to obtain copolymer (A), this present invention process is generally carried out, but is not especially limited. For example, copolymer (A) can be also obtained by a process of: copolymerizing a monomer before adding alkylene oxides or polyalkylene glycol instead of monomer (a) (namely, an unsaturated alcohol such as 3-methyl-3-buten-1-ol, 3-methyl-2-buten-1-ol and 2-methyl-3-buten-2-ol), and monomer (b) in the presence of the polymerization initiator (if necessary, other copolymerizable monomer (c) with these monomers may be further copolymerized.); and thereafter, adding average 10 to 300 moles of alkylene oxides, or reacting with alkoxy polyalkylene glycol having an average addition number of moles in the range of 10 to 300.

The production process for copolymer (A), according to the present invention, comprises copolymerizing comonomers including unsaturated polyalkylene glycol ether monomer (a) and unsaturated monocarboxylic acid monomer (b) as essential components.

The copolymerization can be carried out by conventional methods such as solution polymerization or bulk polymerization. The solution polymerization can be carried out in a batchwise or continuous manner. Examples of a solvent as used in such a case include water; alcohols such as methyl alcohol, ethyl alcohol, and isopropyl alcohol; aromatic or aliphatic hydrocarbons such as benzene, toluene, xylene, cyclohexane, and n-hexane; ester compounds, such as ethyl acetate; ketone compounds such as acetone and methyl ethyl ketone; and cyclic ethers such as tetrahydrofuran and dioxane. Particularly, it is preferable to use at least one kind selected from the group consisting of water and lower alcohols having 1 to 4 carbon atoms because of the solubility of the raw monomers and the copolymer as obtained. Among these, water is more preferable because a solvent removing process can be omitted.

In the production process for copolymer (A), according to the present invention, it is important that: a chain-transfer agent is used during the copolymerization, or pH of a resultant reaction mixture after the copolymerization is adjusted to not less than 5. In the most preferable embodiment of the production process according to the present invention is that a chain-transfer agent is used during the copolymerization, and pH of a resultant reaction mixture after the copolymerization is adjusted to not less than 5. Copolymer (A) according to the present invention, that displays an excellent capacity as a cement admixture, can be obtained efficiently by using the chain-transfer agent and/or adjusting the pH.

If the chain-transfer agent is used during the copolymerization, the molecular weight of copolymer (A) as obtained is easily adjusted. Especially, if the polymerization reaction is carried out in a concentrated condition such that the ratio of the entire monomers as used is 30 weight % or more of the entirety of raw materials, the chain-transfer agent is effectively used.

As the chain-transfer agent, a compound that can adjust the molecular weight is used. Examples of the chain-transfer agent that can be used include: thiol chain-transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecylmercaptan, octylmercaptan, and butyl thioglycolate; halogenated compounds such as carbon tetrachloride, methylene dichloride, bromoform, and bromotrichloroethane; secondary alcohols such as isopropanol; and lower oxidized compounds and their salts such as phosphorous acid, hypophosphorous acid, and their salts (sodium hypophosphite and potassium hypophosphite), sulfurous acid, hydrogensulfite, dithionous acid, metabisulfinic acid, and their salts (sodium sulfite, potassium sulfite, sodium hydrogensulfite, potassium hydrogensulfite, sodium dithionite, potassium dithionite, sodium metabisulfite, and potassium metabisulfite).

Furthermore, monomers having a high chain-transferability can also be used as the chain-transfer agent. Examples thereof include: α,β-unsaturated dicarboxylic acids such as maleic acid, fumaric acid, citraconic acid, and their derivatives and salts (More particularly, examples of the derivatives include: half esters with alcohols having 1 to 30 carbon atoms; half amides with amines having 1 to 30 carbon atoms; half amides or esters with aminoalcohols having 1 to 30 carbon atoms; half esters of compound (x) as obtained by adding 1 to 300 moles in average of alkylene oxides with 2 to 18 carbon atoms to the above-mentioned alcohols; half amides with aminated compounds as obtained by replacing a hydroxyl group at one terminal portion of compound (x) with amino group; half esters with glycols having 2 to 18 carbon atoms or polyalkylene glycols of 2 to 300 in average molar number of addition of these glycols; and half amides with glycols having 2 to 18 carbon atoms or polyalkylene glycols of 2 to 300 in average molar number of addition of these glycols with maleamic acid. Examples of the salts include monovalent metal salts, divalent metal salts, ammonium salts, and organic amine salts); allyl compounds such as allyl alcohol and allyl sulfonic acid (salts), and their adducts with alkylene oxides having 2 to 18 carbon atoms with the average addition number of moles of 2 to 300; and methallyl alcohol, methallyl sulfonic acid (salts), and their adducts with alkylene oxides having 2 to 18 carbon atoms with the average addition number of moles of 2 to 300.

Among the chain-transfer agents as exemplified above, two or more kinds of the chain-transfer agents can be jointly used.

It is preferable that the chain-transfer agent always exists in the reaction system during the copolymerization. Especially, it is effective that the chain-transfer agent, including the thiol chain-transfer agent, the lower oxidized compound or its salt, is not added collectively but added for a long time by adding continuously or divisionally, for example, by adding dropwise. If the concentration of the chain-transfer agent to the monomers in the beginning of the reaction is extremely different from that in the latter half of the reaction and the chain-transfer agent is deficient in the latter half of the reaction, the molecular weight of copolymer (A) is extremely enormous and the capacity thereof as a cement admixture becomes low.

It is preferable that the chain-transfer agent is supplied by means of a different line from a line used for supplying acidic materials such as unsaturated monocarboxylic acid monomer (b) and the peroxide when supplying the chain-transfer agent into the reaction system. Especially, it is effective that the chain-transfer agent is supplied by means of a different line from the line used for supplying the acidic materials when the chain-transfer agent includes the thiol chain-transfer agent, the lower oxidized compound or its salt. For example, if the thiol chain-transfer agent is supplied by means of the same line as used for supplying unsaturated monocarboxylic acid monomer (b), the chain-transfer agent acts on unsaturated monocarboxylic acid monomer (b) as a reaction initiator and a partial polymerization is caused. Therefore, a homopolymer is easily produced and the capacity as a cement admixture becomes low. In addition, if the lower oxidized compound or its salt is supplied by means of the same line as used for supplying the peroxide, the lower oxidized compound or its salt reacts with the peroxide and the peroxide loses reactivity before acting as the reaction initiator.

It is preferable to adjust the pH of the copolymer as obtained by the copolymerization to not less than 5 because of handling. If the copolymerization is carried out at the pH of not less than 5, the dispersibility as the copolymer for cement admixtures becomes low because the polymerization rate becomes low and the copolymerizability is deteriorated. Therefore, it is important that the copolymerization is carried out at the pH of less than 5, and then the pH of the resultant reaction mixture after the copolymerization is adjusted to not less than 5.

The pH can be adjusted by using alkaline substance such as inorganic salts (for example, hydroxides and carbonates of mono- and divalent metals); ammonia; and organic amines. If the chain-transfer agent is used, copolymer (A) as obtained alone can be used as a main component of the cement admixture.

Conventional radical polymerization initiators can be used as an initiator of the polymerization reaction.

When carrying out an aqueous polymerization, as the radical polymerization initiators, peroxides such as persulfate salts (for example, ammonium persulfate, sodium persulfate and potassium persulfate) and hydrogen peroxide are used; and the azo initiators such as azo amidine compounds (for example, 2,2'-azobis-2-methylpropionamidine hydrochloride), cyclic azo amidine compounds (for example, 2,2'-azobis-2-(2-imidazolin-2-yl)propane hydrochloride), and azonitriles (for example, 2-carbamoyl azoisobutyronitrile), are used.

When carrying out the solution polymerization in solvents such as aromatic or aliphatic hydrocarbons, ester compounds and ketone compounds, or the bulk polymerization, as the radical polymerization initiators, peroxides (for example, benzoyl peroxide, lauroyl peroxide, sodium peroxide, t-butyl hydroperoxide and cumene hydroperoxide) are used; and the azo initiator such as azobisisobutyronitrile is used. In addition, when using a solvent mixture of water and lower alcohol, a radical polymerization initiator can be selected suitably among the above various radical polymerization initiators and used. Incidentally, the bulk polymerization is carried out at a temperature of 50 to 200° C.

It is preferable that the copolymerization is caused to start by a redox polymerization initiator comprising a peroxide and a reducing agent.

The reducing agent is not especially limited if the agent is general. Examples thereof include: salts of low-valent metal such as Fe (II), Sn (II), Ti (III), Cr (II), V (II) and Cu (II), represented by Mohr's salts; amines and their salts such as monoethanolamine, diethanolamine, triethanolamine, hydroxylamine, hydroxylamine hydrochloride salt and hydrazine; organic compounds having a group such as —SH, —$SO_2H$, —$NHNH_2$, and —COCH(OH)—, and their salts such as sodium dithionate, formaldehyde sodium sulfoxylate, and acid sodium hydroxymethanesulfite dihydrate; alkali metal sulfites such as sodium sulfite, sodium hydrogensulfite, and metabisulfurous acid salt, and lower oxidized compounds and their salts such as hypophosphorous acid, sodium hypophosphite, sodium hydrosulfite, and sodium hyponitrite; invert sugars such as D-fructose and D-glucose; thiourea compounds such as thiourea and thiourea oxide; L-ascorbic acid (salt), L-ascorbic acid ester, isoascorbic acid (salt), and isoascorbic acid ester.

Examples of a combination of the peroxide and the reducing agent include a combination of benzoyl peroxide and an amine, and a combination of cumene hydroperoxide and a compound of metal such as Fe (II) and Cu (II). Among these, especially, a combination of the aqueous peroxide and the reducing agent is preferable, and particular preferable examples include a combination of hydrogen peroxide and L-ascorbic acid, a combination of hydrogen peroxide and isoascorbic acid, a combination of hydrogen peroxide and Mohr's salt, and a combination of sodium persulfate and sodium hydrogensulfite. The most preferable combination is a combination of hydrogen peroxide and L-ascorbic acid.

The combining ratio of the peroxide is preferably in the range of 0.01 to 30 mol % of the entirety of comonomers, more preferably 0.1 to 20 mol %, most preferably 0.5 to 10 mol %. In case where the combining ratio is less than 0.01 mol %, the unreacted monomers increase. On the other hand, in case where the combining ratio is more than 30 mol %, it is not preferable because polycarboxylic acids having a plenty of oligomer portion are obtained.

The combining ratio of the reducing agent is preferably in the range of 0.1 to 500 mol % of the peroxide, more preferably 1 to 200 mol %, most preferably 10 to 100 mol %. In case where the combining ratio is less than 0.1 mol %, an active radical does not generate enough and the unreacted monomers increase. On the other hand, in case where the combining ratio is more than 500 mol %, it is not preferable because the unreacted residual reducing agent increases.

It is preferable that at least one selected from the group consisting of the peroxide and the reducing agent always exists in the reaction system during the copolymerization. For example, it is preferable if the peroxide and the reducing agent are not added collectively at the same time. Both are added for a long time by adding continuously or divisionally, for example, by adding dropwise. If the peroxide and the reducing agent are added collectively, it becomes difficult to control the reaction because the peroxide and the reducing agent react suddenly and much heat of reaction is generated, and further, plenty of unreacted monomers remain because a radical concentration decreases quickly thereafter. Moreover, a molecular weight distribution of copolymer (A) is extremely enormous and the capacity thereof as a cement admixture becomes low, because a radical concentration to the monomers in the beginning of the reaction is extremely different from that in the latter half of the reaction. Incidentally, a time from charging one to starting to charge the other is preferably within 5 hours, particular preferably within 3 hours.

During the copolymerization, in order to obtain high monomer reactivity, it is necessary to carry out the polymerization reaction at a temperature that causes the half-life period of the radical polymerization initiator to be in the range of 0.5 to 500 hours, preferably 1 to 300 hours, more preferably 3 to 150 hours. For example, if using persulfates salts as the initiator, the polymerization reaction temperature is fitly in the range of 40 to 90° C., preferably 42 to 85° C., more preferably 45 to 80° C. In addition, if hydrogen peroxide is combined with L-ascorbic acid (salt) as the initiator, the polymerization reaction temperature is fitly in the range of 30 to 90° C., preferably 35 to 85° C., more preferably 40 to 80° C. The polymerization time is fitly in the range of 0.5 to 10 hours, preferably 0.5 to 8 hours, more preferably 1 to 6 hours. In case where the polymerization time is shorter or longer than this range, it is not preferable because of causing the polymerization rate or productivity to become low.

The ratio of the entire monomers as used during the copolymerization is in the range of 30 to 95 weight % of the entirety of raw materials, preferably 40 to 93 weight %, more preferably 50 to 90 weight %. In case where the ratio of the entire monomers as used is more or less than this range, it is not preferable because of causing the polymerization rate or productivity to become low.

As to an addition method for the respective monomers into the reactor when copolymerizing the comonomers, it is preferable that: a point of time, when the cumulative ratio of added unsaturated polyalkylene glycol ether monomer (a) into a reactor (the ratio of added monomer (a) of the entirety of monomer (a), weight %) is more than the cumulative ratio of added unsaturated monocarboxylic acid monomer (b) into the reactor (the ratio of added monomer (b) of the entirety of monomer (b), weight %), exists in the course of the polymerization process. The below mentioned methods can be exemplified concretely.

(1) The method which comprises adding the entirety of monomer (a) into the reactor collectively before starting the polymerization, and adding the entirety of monomer (b) into the reactor divisionally or continuously after starting to add the polymerization initiator into the reactor.

(2) The method which comprises adding the entirety of monomer (a) and a portion of monomer (b) into the reactor collectively before starting the polymerization, and adding the remaining portion of monomer (b) into the reactor divisionally or continuously after starting to add the polymerization initiator into the reactor.

(3) The method which comprises adding a portion of monomer (a) into the reactor collectively before starting the polymerization, and adding the remaining portion of monomer (a) and the entirety of monomer (b) into the reactor divisionally or continuously after starting to add the polymerization initiator into the reactor.

(4) The method which comprises adding a portion of monomer (a) and a portion of monomer (b) into the reactor collectively before starting the polymerization, and adding the remaining portion of monomer (a) and the remaining portion of monomer (b) into the reactor divisionally or continuously after starting to add the polymerization initiator into the reactor, wherein the addition completing time of monomer (b) into the reactor is later than that of monomer (a).

(5) The method which comprises adding a portion of monomer (a) and a portion of monomer (b) into the reactor collectively before starting the polymerization, and adding the remaining portion of monomer (a) and the remaining portion of monomer (b) into the reactor divisionally or continuously after starting to add the polymerization initiator into the reactor, wherein a point of time, when the cumulative ratio of added monomer (a) into the reactor (the ratio of added monomer (a) of the entirety of monomer (a), weight %) is more than the cumulative ratio of added monomer (b) into the reactor (the ratio of added monomer (b) of the entirety of monomer (b), weight %), exists.

(6) The method which comprises adding the entirety of monomer (a) and the entirety of monomer (b) into the reactor divisionally or continuously after starting to add the polymerization initiator into the reactor, wherein a point of time, when the cumulative ratio of added monomer (a) into the reactor (the ratio of added monomer (a) of the entirety of monomer (a), weight %) is more than the cumulative ratio of added monomer (b) into the reactor (the ratio of added monomer (b) of the entirety of monomer (b), weight %), exists.

The above exemplified methods (1) to (6) enable to polymerize monomer (a) and monomer (b) efficiently nevertheless the polymerizability of monomer (a) is lower than that of monomer (b). In addition, an addition method for monomer (c) is not especially limited. A method which comprises adding the entirety thereof into the reactor initially collectively, a method which comprises adding the entirety thereof into the reactor divisionally or continuously, or a method which comprises adding a portion thereof into the reactor initially and adding the remaining portion thereof into the reactor divisionally or continuously, can be adopted. In addition, the neutralization ratios of monomer (b) and monomer (c) are not especially limited, and can be changed so that the ratios cannot have an influence upon such as polymerization initiators and chain-transfer agents. The polymerization reaction is carried out in such a condition. After the reaction, the neutralization or the adjustment of concentration is carried out if necessary.

The combining ratio between the respective monomers as used for the polymerization to produce copolymer (A) is not especially limited if monomer (a) and monomer (b) are essential. This ratio is fitly in the range of (1 to 99)/(1 to 99)/(0 to 70) (weight %) as (monomer (a))/(monomer (b))/(monomer (c)), but such a ratio is preferably in the range of (50 to 99)/(1 to 50)/(0 to 49) (weight %), more preferably in the range of (55 to 98)/(2 to 45)/(0 to 40) (weight %), still more preferably in the range of (60 to 97)/(3 to 40)/(0 to 30) (weight %), (wherein the entirety of monomer (a), monomer (b) and monomer (c) is 100 weight %). In addition, the weight-average molecular weight of copolymer (A) is fitly in the range of 10,000 to 300,000 in terms of polyethylene glycol by gel permeation chromatography (hereinafter, denoted to "GPC"), preferably 10,000 to 100,000, more preferably 10,000 to 80,000, still more preferably 10,000 to 70,000. The copolymer for cement admixtures displaying higher dispersibility can be obtained by selecting ranges of the combining ratio of these respective monomers and the weight-average molecular weight.

Hereinafter, second copolymer (A') for cement admixtures, according to the present invention, is described.

Second copolymer (A') for cement admixtures, according to the present invention, fulfills parameters i) to iv) mentioned below, and unsaturated polyalkylene glycol ether monomer (a) having an alkenyl group having 5 carbon atoms coexists. Copolymer (A') like this can be also obtained by the above production process, but a production process for copolymer (A') is not especially limited to this process.

i) The copolymer has a weight-average molecular weight of not less than 10,000. Consequently, the copolymer displays high dispersibility.

ii) The copolymer has respective signals detected at the chemical shifts of 0.6 to 1.0 ppm, 1.2 to 1.8 ppm, 1.8 to 2.4 ppm and 3.2 to 3.8 ppm with $^1$H-NMR. A copolymer having signals detected at the nearly same chemical shifts as chemical shifts (1.8 to 2.4 ppm, 1.2 to 1.8 ppm and 0.6 to 1.0 ppm) obtained by measuring a copolymer of acrylic acid and 3-methyl-3-buten-1-ol, and as a chemical shift (3.2 to 3.8 ppm) obtained by measuring methoxypolyethylene glycol, can display excellent capacity as a cement admixture. Incidentally, a nuclear magnetic resonance apparatus (400MHz) is used to measure the signals of $^1$H-NMR. At the measurement, a very small amount of trioxane is added as an internal standard in addition to a sample, and all the signals when a signal of trioxane is displayed as 100% in a measuring display, that can be detected as signals, are regarded as signals. Hereupon, the detected signals are signals of which tops are included in the above ranges within ordinary ranges.

iii) The copolymer has respective signals detected at the chemical shifts of 20.0 to 30.0 ppm, 30.0 to 50.0 ppm, 58.0 to 62.0 ppm and 60.0 to 80.0 ppm with $^{13}$C-NMR. A copolymer having signals detected at the nearly same chemical shifts as chemical shifts (30.0 to 50.0 ppm and 20.0 to 30.0 ppm) obtained by measuring a copolymer of acrylic acid and 3-methyl-3-buten-1-ol, and as chemical shifts (60.0 to 80.0 ppm and 58.0 to 62.0 ppm) obtained by measuring methoxypolyethylene glycol, can display excellent capacity as a cement admixture. Incidentally, a nuclear magnetic resonance apparatus (400 MHz) is used to measure the signals of $^{13}$C-NMR.

iv) The copolymer has a spin-spin relaxation time ($T_2$) of 1 msec to 50 msec as to the signal observed at 1.2 to 1.8 ppm with $^1$H-NMR, and/or a spin-spin relaxation time ($T_2$) of 1 msec to 90 msec as to the signal observed at 1.8 to 2.4 ppm with $^1$H-NMR. $T_2$ as to the signal observed at 1.2 to 1.8 ppm is preferably in the range of 2 msec to 48 msec, more preferably 5 msec to 45 msec. In addition, $T_2$ as to the signal observed at 1.8 to 2.4 ppm is preferably in the range of 2 msec to 90 msec, more preferably 5 msec to 90 msec. The copolymer having $T_2$ in such range displays high dispersibility as a cement admixture. In case where $T_2$ as to the respective signals are less than 1 msec, the capacity of the copolymer as a cement admixture becomes low. Incidentally, a nuclear magnetic resonance apparatus (400 MHz) is used to measure the spin-spin relaxation time ($T_2$), and the measuring method is carried out by measuring hydrogen nucleus according to CPMG method.

The conversion of the polymerization reaction is usually in the range of about 60 to about 95%, about 99% at most. Unsaturated polyalkylene glycol ether monomer (a) having an alkenyl group having 5 carbon atoms coexists in copolymer (A') because of unfinishing the reaction or other reasons. For example, the combining ratio of monomer (a) is preferably not more than 40 weight %, more preferably 0.01 to 40 weight %, still more preferably 0.1 to 30 weight %, most preferably 1.0 to 10 weight %. The states of raw concrete are improved because monomer (a) exists.

Incidentally, unsaturated polyalkylene glycol ether monomer (a) having an alkenyl group having 5 carbon atoms can be confirmed by the below mentioned procedure.

1) All the carboxyl groups of copolymer (A') is neutralized with sodium hydroxide in order to obtain carboxylic acid salt thereof.

2) After removing water in a neutralized mixture with an evaporator, a resultant mixture is dried under a reduced pressure at 50° C. in order to obtain a dried product.

3) A solvent is added to the dried product as obtained and Soxhlet extraction is carried out in order to extract monomers from the dried product.

4) The low molecular weight substances are removed by dialysis or ultrafiltration.

5) Monomer (a) is separated and purified with liquid chromatography.

6) Monomer (a) is confirmed with $^1$H-NMR and $^{13}$C-NMR.

Copolymers (A) and (A') for cement admixtures according to the present invention, can be used as a admixture for various hydraulic materials, namely, cement and hydraulic materials except for cement such as gypsum.

The cement admixture, according to the present invention, comprises the above copolymer (A) and/or (A') as a essential component. The copolymer alone can be the admixture, but the admixture may further include a defoaming agent. The change of the quantity of entrained air with the passage of time can be rendered small by adding the defoaming agent. If the quantity of entrained air is too little, the ability to resist freeze-thaw cycling is deteriorated. If the quantity of entrained air is too much, the strength of concrete becomes low. Therefore, it is necessary to keep the quantity of entrained air constant. Accordingly, the quantity of entrained air can be kept stably with the passage of time and concrete having a stable quality can be supplied by use of the defoaming agent.

The defoaming agent is not especially limited if the defoaming agent is a conventional one. Examples thereof include: mineral oil base defoaming agents, such as kerosine and liquid paraffin; oils-and-fats base defoaming agents, such as animal and plant oils, sesame oil, castor oil and their alkylene oxide adducts; fatty acid base defoaming agents, such as oleic acid, stearic acid and their alkylene oxide adducts; fatty acid ester base defoaming agents, such as diethylene glycol monolaurate, glycerol monoricinolate, alkenyl succinic acid derivatives, sorbitol monolaurate, sorbitol trioleate, polyoxyethylene monolaurate, polyoxyethylene sorbitol monolaurate, and natural wax; alcohol base defoaming agents, for example: octyl alcohol, hexadecyl alcohol, acetylene alcohol, glycols, and polyoxyalkylene glycol; amide base defoaming agents, such as polyoxyalkyleneamide and acrylate polyamines; phosphoric acid ester base defoaming agents, such as tributyl phosphate and sodium octyl phosphate; metal soap base defoaming agents, such as aluminum stearate and calcium oleate; silicone base defoaming agents, such as silicone oils, silicone pastes, silicone emulsions, organic-modified polysiloxanes, and fluorosilicone oils; and oxyalkylene base defoaming agents, such as polyoxyethylene polyoxypropylene adducts. There can be used either alone respectively or in combinations with each other.

Among these defoaming agents as exemplified above, the oxyalkylene base defoaming agent is most preferable. When the copolymer for cement admixtures, according to the present invention, is used in combination with the oxyalkylene base defoaming agent, an amount of the defoaming agents as used is reduced and the compatibility of the defoaming agent and the admixture is excellent. The oxyalkylene base defoaming agent is not limited if it is a compound having an oxyalkylene group in the molecule and the function to reduce air bubbles in an aqueous solution. Among these, the specific oxyalkylene based defoaming agent represented by the below general formula (1) are preferable.

$$R^1\{\!-\!T\!-\!(R^2O)_t\!-\!R^3\}_n \tag{1}$$

(wherein $R^1$ and $R^3$ each independently represent hydrogen, alkyl group having 1 to 22 carbon atoms, alkenyl group having 1 to 22 carbon atoms, alkynyl group having 1 to 22 carbon atoms, phenyl group or alkylphenyl group (the alkyl group in the alkylphenyl group having 1 to 22 carbon atoms), $R^2O$ represents one oxyalkylene group having 2 to 4 carbon atoms or a mixture of two or more of the oxyalkylene group and may be added in a block or random manner when it is a mixture, t is an average addition number of moles of the oxyalkylene groups and represents a number of 0 to 300, $R^1$ and $R^3$ cannot be hydrogen at the same time when t is 0, T represents —O—, —CO$_2$—, —SO$_4$—, —PO$_4$— or —NH—, n presents an integer of 1 or 2, and n is 1 when $R^1$ is hydrogen).

Examples of the oxyalkylene base defoaming agents include: polyoxyalkylenes such as (poly)oxyethylene (poly)oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols with 12 to 14 carbon atoms; (poly)oxyalkylene (alkyl) aryl ethers such as polyoxypropylene phenyl ether and polyoxyethylene nonyl phenyl ether; acetylene ethers as formed by addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid; (poly)oxyalkylene sorbitan fatty acid esters such as (poly)oxyethylene sorbitan monolauric acid ester and (poly)oxyethylene sorbitan trioleic acid ester; (poly)oxyalkylene alkyl (aryl) ether sulfuric acid ester salts such as sodium polyoxypropylene methyl ether sulfate, and sodium polyoxyethylene dodecylphenol ether sulfate; (poly)oxyalkylene alkyl phosphoric acid esters such as (poly)oxyethylene stearyl phosphate; and (poly)oxyalkylene alkylamines such as polyoxyethylene laurylamine. These can be used either alone respectively or in combinations with each other.

If the cement admixture includes the defoaming agent, the combining ratio of the defoaming agent is preferably in the range of 0.01 to 10 weight % of the copolymer for cement admixtures according to the present invention, more preferably 0.5 to 5 weight %.

The cement composition, according to the present invention, includes the copolymer for cement admixtures according to the present invention, and cement as essential components. In addition, the cement composition, according to the present invention, may include the cement admixture according to the present invention, and cement as essential components. Needless to say, the cement admixture (or the copolymer), according to the present invention, is effective to a hydraulic composition including a hydraulic material except for cement. Examples thereof include a hydraulic composition including the copolymer for cement admixtures according to the present invention, and gypsum as essential components. In addition, the cement composition, according to the present invention, may further include water. The hydraulic property of the cement composition arises and the cement composition can be hardened by including water. The cement composition, according to the present invention, if necessary, may further include fine aggregates (for example, sands) and coarse aggregates (for example, cracked stones). Examples of the cement composition like this include cement paste, mortar, concrete and plaster.

The cement that can be used is not especially limited, but examples thereof include portland cement (such as standard types, high-early-strength types, ultra-high-early-strength types, moderate heat types, sulfate salt resistance types and low alkali types thereof); various mixed cement (such as blast furnace cement, silica cement and fly ash cement); white portland cement; alumina cement; ultra rapid hardening cement (such as 1 clinker rapid hardening cement, 2 clinker rapid hardening cement and magnesium phosphate cement); grout cement; oil-well cement; low calorific cement (low-calorific type blast furnace cement, fly ash mixed low-calorific type blast furnace cement and much belite containing cement); ultra-high strength cement; cement type solidifiers; and ecological cement (such as cement produced from at least one raw material selected from the group consisting of ash from an urban garbage furnace and ash from an sewage garbage furnace). In addition, fine powder such as blast furnace slag, fly ash, cinder ash, clinker ash, husk ash, silica fume, silica powder and limestone powder; or gypsum can be added.

In addition, refractory aggregates such as silica, clay, zircon, high alumina, silicon carbide, carbon, chromate, chrome magnesite and magnesia, can be used as the aggregates, except for gravel, cracked stones, water-granulated slag and recycled aggregates.

In the cement composition comprising the copolymer according the present invention, there is no especial limitation with regard to the unit water amount per 1 m³, the amount of cement as used and the ratio of water/cement. The unit water amount of 100 to 185 kg/m³, preferably 120 to 175 kg/m³, and the amount of cement as used of 250 to 800 kg/m³, preferably 270 to 800 kg/m³, and the ratio of water/cement of 10 to 70 weight %, preferably 20 to 65 weight % are recommended. The above amount and ratio can be applied to broad range such as a little to much combination, and is effective to both high strength concrete having much unit cement amount and a little combining concrete having the unit cement amount of 300 kg/m³ or less.

In the cement composition comprising the copolymer according to the present invention, the combining ratio of the copolymer is not especially limited, but when the copolymer is used for mortar or concrete containing hydraulic cement, the amount of the copolymer that adjusts the combining ratio of 0.01 to 2.0% to the cement weight, preferably 0.02 to 1.0 weight %, more preferably 0.05 to 0.5 weight %, can be added. Preferred various effects such as reducing the unit water amount, increasing strength and improving durability can be caused by adding the copolymer. In case where the combining ratio is less than 0.01%, it is not sufficient to the performance. On the other hand, even if the much copolymer with the combing ratio of more than 2.0% is used, the effects substantially reaches the uppermost limit and it is disadvantageous in view of economy.

In addition, the cement admixture (or the copolymer), is effective to concrete for secondary concrete product, centrifugal molded concrete, vibrational tightened concrete, steam cured concrete and spraying concrete. Furthermore, the copolymer is also effective to mortar and concrete necessary to have high fluidity, such as high flowing concrete, self-filling concrete and self-leveling agents.

The copolymer, according the present invention, can be used alone in the form of an aqueous solution as a main component of cement admixtures. However, the copolymer can be powdered and used by neutralizing the copolymer with hydroxides of a divalent metal such as calcium and magnesium to produce a multivalent metal salt thereof and drying thereafter, or by fixing the copolymer on inorganic powder such as silica fine powder and drying.

The cement admixture (or the copolymer), according to the present invention, can be used jointly in combinations with a conventional cement dispersant. The conventional cement dispersant that can be used, is not especially limited, but examples thereof include various sulfonic acid dispersants having a sulfonic acid group in the molecules and various polycarboxylic acid dispersants having a polyoxyalkylene chain and a carboxylic acid group in the molecules. Examples of the various sulfonic acid dispersants include: ligninsulfonic acid salts; polyol derivatives; naphthalenesulfonic acid-formalin condensation products; melaminesulfonic acid-formalin condensation products; polystyrenesulfonic acid salts; and aminosulfonic compounds, such as aminoarylsulfonic acid-phenol-formaldehyde condensation products. In addition, examples of the various polycarboxylic acid dispersants include: a copolymer obtained by copolymerizing comonomers including a polyalkylene glycol mono(meth)acrylic acid ester monomer having a polyoxyalkylene chain obtained by adding an alkylene oxide with 2 to 18 carbon atoms with the average addition number of moles of 2 to 300, and a (meth)acrylic acid monomer as essential components; a copolymer obtained by copolymerizing comonomers including three kinds of monomers consisting of a polyalkylene glycol mono(meth)acrylic acid ester monomer having a polyoxyalkylene chain obtained by adding an alkylene oxide with 2 to 18 carbon atoms with the average addition number of moles of 2 to 300, a (meth) acrylic acid monomer, and (meth)acrylic acid alkyl ester as essential components; a copolymer obtained by copolymerizing comonomers including three kinds of monomers consisting of a polyalkylene glycol mono(meth)acrylic acid ester monomer having a polyoxyalkylene chain obtained by adding an alkylene oxide with 2 to 18 carbon atoms with the average addition number of moles of 2 to 300, a (meth) acrylic acid monomer, and (meth)allylsulfonic acid (salts thereof) (or, either vinylsulfonic acid (salts thereof) or p-(meth)allyloxybenzenesulfonic acid (salts thereof)) as essential components; a grafted copolymer obtained by copolymerizing comonomers including three kinds of monomers consisting of a polyalkylene glycol mono(meth) acrylic acid ester monomer having a polyoxyalkylene chain obtained by adding an alkylene oxide with 2 to 18 carbon atoms with the average addition number of moles of 2 to 300, a (meth)acrylic acid monomer, and (meth)allylsulfonic acid as essential component to obtain a copolymer, and further graft polymerizing the copolymer with (meth) acrylamide and/or 2-(meth)acrylamido-2-methylpropanesulfonic acid; a copolymer obtained by copolymerizing comonomers including four kinds of monomers consisting of a polyalkylene glycol mono(meth)acrylic acid ester monomer having a polyoxyalkylene chain obtained by adding an alkylene oxide with 2 to 18 carbon atoms with the average addition number of moles of 2 to 300, a polyalkylene glycol mono(meth)allyl ether monomer having a polyoxyalkylene chain obtained by adding an alkylene oxide with 2 to 18 carbon atoms with the average addition number of moles of 2 to 300, a (meth)acrylic acid monomer, and (meth)allylsulfonic acid (salts thereof) (or p-(meth) allyloxybenzenesulfonic acid (salts thereof)) as essential components; a copolymer obtained by copolymerizing comonomers including a polyalkylene glycol mono(meth) allyl ether monomer having a polyoxyalkylene chain obtained by adding an alkylene oxide with 2 to 18 carbon atoms with the average addition number of moles of 2 to 300, and a maleic acid monomer as essential components; a copolymer obtained by copolymerizing comonomers including a polyalkylene glycol mono(meth)allyl ether monomer having a polyoxyalkylene chain obtained by adding an alkylene oxide with 2 to 18 carbon atoms with the average addition number of moles of 2 to 300, and a polyalkylene glycol maleic acid ester monomer as essential components; and an esterified product of a copolymer and a hydroxyl-terminal polyoxyalkylene derivative, wherein the copolymer is obtained by copolymerizing a polyalkylene glycol mono (meth)allyl ether monomer having a polyoxyalkylene chain obtained by adding an alkylene oxide with 2 to 18 carbon atoms with the average addition number of moles of 2 to 300, and maleic anhydride. These conventional cement dispersants can be jointly used in plural.

Incidentally, when the above conventional cement dispersant is jointly used, the mixing ratio by weight of the copolymer according to the present invention to the conventional cement dispersant is in the range of (5 to 95):(95 to 5), preferably (10 to 90):(90 to 10), though not uniformly determinable, because of depending on differences in factors such as kind, composition, and test conditions of the cement dispersant as used.

Furthermore, the cement admixture comprising the copolymer of the present invention can be used in combination with other conventional cement additives (materials to add to cement) (1) to (10) as exemplified below:

(1) water-soluble high-molecular substances, for example: unsaturated carboxylic acid polymers such as polyacrylic acid (or its sodium salt), polymethacrylic acid (or its sodium salt), polymaleic acid (or its sodium salt), and sodium salts of acrylic acid-maleic acid copolymers; polymers or copolymers of polyoxyethylene or polyoxypropylene such as polyethylene glycol and polypropylene glycol; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharide derivatives, of which a portion or the entirety of hydrogen atoms of alkylated or hydroxyalkylated polysaccharides such as methyl cellulose, ethyl cellulose, and hydroxypropyl cellulose is replaced with a hydrophobic substituent having a hydrocarbon chain with 8 to 40 carbon atoms as a partial structure and an ionic hydrophilic substituent including a sulfonic acid group or a salt thereof as a partial structure; polysaccharides produced by microbiological fermentation such as yeast glucan, xanthane gum, and $\beta$-1.3 glucans (which may be either a linear or branched chain type and of which examples include curdlan, paramylon, vacciman, scleroglucan and laminaran); polyacrylamide; polyvinyl alcohol; starch; starch phosphate; sodium alginate; gelatin; and acrylic acid copolymers having an amino group in their molecules and their quaternized compounds;

(2) high-molecular emulsions, for example: copolymers of various vinyl monomers such as alkyl (meth)acrylates;

(3) retarders, for example: oxycarboxylic acids such as gluconic acid, glucoheptonic acid, arabonic acid, malic acid or citric acid, and their inorganic or organic salts of sodium, potassium, calcium, magnesium, ammonium and triethanolamine; saccharides, for example, monosaccharides such as glucose, fructose, galactose, saccharose, xylose, apiose, ribose, and isomerized saccharides, or oligosaccharides such as disaccharides and trisaccharides, or oligosaccharides such as dextrin, or polysaccharides such as dextran, or molasses including them; sugar alcohols such as sorbitol; magnesium silicofluoride; phosphoric acid and its salts or borates; aminocarboxylic acids and its salts; alkali-soluble proteins; fumic acid; tannic acid; phenol; polyhydric alcohols such as glycerol; and phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and their alkaline metal salts and alkaline earth metal salts;

(4) high-early-strength agents and promoters, for example: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonic acid salts; thiosulfates; formic acid and formates such as calcium formate; alkanol amines; alumina cement; and calcium aluminate silicate;

(5) AE agents, for example: resin soap, saturated or unsaturated fatty acids, sodium hydroxystearate, lauryl sulfate, ABS (alkylbenzenesulfonic acids), LAS (linear alkylbenzenesulfonic acids), alkanesulfonates, polyoxyethylene alkyl (phenyl) ethers, polyoxyethylene alkyl (phenyl) ether sulfuric acid esters or its salts, polyoxyethylene alkyl (phenyl) ether phosphoric acid esters or its salts, protein materials, alkenylsulfosuccinic acids, and $\alpha$-olefinsulfonates;

(6) other surfactants, for example: polyalkylene oxide derivatives as formed by addition of 10 mol or more of alkylene oxides, such as ethylene oxide and propylene oxide, to aliphatic monohydric alcohols with 6 to 30 carbon atoms in the molecules, such as octadecyl alcohol and stearyl alcohol, or to alicyclic monohydric alcohols with 6 to 30 carbon atoms in the molecules, such as abiethyl alcohol, or to monovalent mercaptans with 6 to 30 carbon atoms in the molecules, such as dodecyl mercaptan, or to alkylphenols with 6 to 30 carbon atoms in the molecules, such as nonylphenol, or to amines with 6 to 30 carbon atoms in the molecules, such as dodecylamine, or to carboxylic acids with 6 to 30 carbon atoms in the molecules, such as lauric acid and stearic acid; alkyl diphenyl ether sulfonates as formed by ether-bonding of two phenyl groups having a sulfonic acid group, which may have an alkyl or alkoxy group as a substituent; various kinds of anionic surfactants; various kinds of cationic surfactants such as alkylamine acetate and alkyltrimethylammonium chloride; various kinds of nonionic surfactants; and various kinds of amphoteric surfactants;

(7) waterproofing agents, for example: fatty acids (or their salts), fatty acid esters, oils and fats, silicone, paraffin, asphalt, and wax;

(8) anticorrosives, for example: nitrous acid salts, phosphoric acid salts, and zinc oxide;

(9) fissure-reducing agents, for example: polyoxyalkyl ethers; and

(10) swelling materials, for example: ettringite base and coal base ones.

Examples of yet other conventional cement additives (materials to add to cement) include: cement humectants, thickeners, separation-decreasing agents, flocculants, dry-shrinkage-diminishing agents, strength-enhancing agents, self-levelling agents, anticorrosives, colorants, and mold-proofing agents. The above conventional cement additives (materials to add to cement) can be jointly used in plural.

Examples of especially preferable embodiments include the following 1) to 6):

1) A combination comprising the following essential components: (1) the cement admixture comprising the copolymer according to the present invention, and (2) the copolymer obtained by copolymerizing comonomers including a polyalkylene glycol mono(meth)acrylic acid ester monomer having a polyoxyalkylene chain obtained by adding an alkylene oxide with 2 to 18 carbon atoms with the average addition number of moles of 2 to 300, and a (meth)acrylic acid monomer. Incidentally, the mixing weight ratio of (1) the cement admixture to (2) the copolymer is preferably in the range of (5 to 95):(95 to 5), more preferably (10 to 90):(90 to 10).

2) A combination comprising the following two essential components: (1) the cement admixture comprising the copolymer according to the present invention and (2) the sulfonic acid dispersant having a sulfonic acid group in the molecule. Incidentally, examples of the sulfonic acid dispersant include: ligninsulfonic acid salts; naphthalenesulfonic acid-formalin condensation products; melamine-sulfonic acid-formalin condensation products; polystyrenesulfonic acid salts; and aminosulfonic compounds, such as aminoarylsulfonic acid-phenol-formaldehyde condensation products. Incidentally, the mixing weight ratio of (1) the cement admixture to (2) the sulfonic acid dispersant is preferably in the range of (5 to 95):(95 to 5), more preferably (10 to 90):(90 to 10).

3) A combination comprising the following two essential components: (1) the cement admixture comprising the copolymer according to the present invention and (2) a ligninsulfonic acid salt. Incidentally, the mixing weight ratio of (1) the cement admixture to (2) the ligninsulfonic acid salt is preferably in the range of (5 to 95):(95 to 5), more preferably (10 to 90):(90 to 10).

4) A combination comprising the following two essential components: (1) the cement admixture comprising the copolymer according to the present invention and (2) a material separation-decreasing agent. Incidentally, examples of the material separation-decreasing agent that can be used include: various thickeners such as nonionic cellulose ethers, and a compound having a hydrophobic substituent having a hydrocarbon chain with 4 to 30 carbon atoms and a polyoxyalkylene chain obtained by adding an alkylene oxide with 2 to 18 carbon atoms with the average addition number of moles of 2 to 300 as partial structures. Incidentally, the mixing weight ratio of (1) the cement admixture to (2) the material separation-decreasing agent is preferably in the range of (10 to 99.99):(90 to 0.01), more preferably (50 to 99.9):(50 to 0.1). The cement composition according to this combination is preferable as high flowing concrete, self-filling concrete and self-leveling agents.

5) A combination comprising the following two essential components: (1) the cement admixture comprising the copolymer according to the present invention and (2) the retarder. Examples of the retarder that can be used include: oxycarboxylic acids such as gluconic acid (salt thereof) and citric acid (salt thereof), saccharides such as glucose, sugar alcohols such as sorbitol, and phosphoric acid such as aminotri(methylenephosphonic acid). Incidentally, the mixing weight ratio of (1) the cement admixture to (2) the retarder is preferably in the range of (50 to 99.9):(50 to 0.1), more preferably (70 to 99):(30 to 1).

6) A combination comprising the following two essential components: (1) the cement admixture comprising the copolymer according to the present invention and (2) the promotor. Examples of the promotor that can be used include: soluble calcium salts such as calcium chloride, calcium nitrite and calcium nitrate; chlorides such as iron chloride and magnesium chloride; thiosulfates; and formic acid and formates such as calcium formate. Incidentally, the mixing weight ratio of (1) the cement admixture to (2) the promotor is preferably in the range of (10 to 99.9):(90 to 0.1), more preferably (20 to 99):(80 to 1).

Effects and Advantages of the Invention

The present invention can provide: a copolymer for cement admixtures wherein the copolymer exhibits high dispersibility, particularly, excellent dispersibility even in a high water-reducing ratio range, even if the amount of addition of this copolymer is small; and a cement admixture comprising this copolymer, In addition, a cement composition containing the cement admixture according to the present invention exhibits excellent fluidity and is therefore improved with regard to obstacles to execution of works.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto. Incidentally, in the examples, unless otherwise noted, the units "%" and "part(s)" denote those by weight, and the air quantity is expressed by the unit "vol %".

Incidentally, the resultant copolymers for cement admixtures were analyzed in the following ways:

<¹H-NMR measurement>

| | |
|---|---|
| Apparatus: | Unity Plus (400 MHz), produced by Varian Co., Ltd. |
| Probe: | four-nuclear autoswitchable probe |
| Nucleus for observe transmitter: | hydrogen nucleus |
| Measurement conditions: | 90° pulse width: 22.5 µsec (45° pulse was irradiated)<br>first delay: 3.0 sec<br>number of transients: 256 |
| Preparation process for sample: | the copolymer for cement admixtures was dried under vacuum to entirely remove the solvent from the copolymer, and then 199.0 mg of the dried copolymer and 1.0 mg of trioxane were dissolved into 800.0 mg of deuterium oxide. |

A signal, detectable when the signal of trioxane was indicated in a size of 100% on the display under these conditions, was taken as a signal. Incidentally, 1,4-dioxane as an external standard in $D_2O$ was measured and a signal thereof was regarded as 3.74 ppm. Then, the measurement was carried out with fixing rfl (reference peak position in directly detected dimension) and rfp (reference peak frequency in directly detected dimension) as the same values respectively at all times.

<¹³C-NMR measurement>

(Measuring method A)

| | |
|---|---|
| Apparatus: | Unity Plus (400 MHz), produced by Varian Co., Ltd. |
| Probe: | four-nuclear autoswitchable probe |
| Nucleus for observe transmitter: | carbon nucleus |
| Measurement conditions: | 90° pulse width: 15.1 µsec (1/3 of 90° pulse was irradiated)<br>Power level for first decoupler with linear amplifier: 38 dB<br>first delay: 0.939 sec<br>number of transients: 25,000 |

(Measuring method B)

| | |
|---|---|
| Apparatus: | Avance 400 (400 MHz), produced by Bruker Co., Ltd. |
| Probe: | 5 mm BBO BB-1H-D Z-GRD |
| Nucleus for observe transmitter: | carbon nucleus |
| Measurement conditions: | 90° pulse width: 7.5 µsec (1/3 of 90° pulse was irradiated)<br>Power level for first decoupler with linear amplifier: −1 dB<br>first delay: 2.00 sec<br>number of transients: 25,000 |
| Preparation process for sample: | the copolymer for cement admixtures was dried under vacuum to entirely remove the solvent from the copolymer, and then 200.0 mg of the dried copolymer was dissolved into 800.0 mg of deuterium oxide. |

The measurement was carried out by the above measuring method A or B under the respective condition. 1,4-Dioxane as an external standard in $D_2O$ was measured and a signal thereof was regarded as 66.7 ppm. Then, the measurement was carried out with fixing rfl (reference peak position in directly detected dimension) and rfp (reference peak frequency in directly detected dimension) as the same values respectively at all times in measuring method A, and was carried out with fixing sr (decoupler frequency offset) as the same value at all times in measuring method B.

<Spin-spin relaxation time ($T_2$) measurement conditions>

| | |
|---|---|
| Apparatus: | Unity Plus (400 MHz), produced by Varian Co., Ltd. |
| Probe: | four nuclear autoswitchable probe |
| Measurement method: | CPMG method |
| Nucleus for observe transmitter: | hydrogen nucleus |
| Measurement conditions: | observation pulse width: 22.5 µsec<br>number of transients: 64<br>first delay: 16 sec<br>incremented delay in first indirectly detected dimension: 40 µsec<br>bt array: the measurement was carried out by making variations at 0.0004, 0.0008, 0.001, 0.002, 0.004, 0.006, 0.008, 0.01, 0.02, 0.03, 0.04, 0.05, 0.06, 0.07, 0.08, 0.09, 0.1, 0.5, 1 sec |
| Sample preparation conditions: | the copolymer for cement admixtures was dried under vacuum to entirely remove the solvent from the copolymer, and then 50 mg of the dried copolymer was dissolved into 950 mg of deuterium oxide. |

<Weight-average molecular weight measurement conditions>

| | |
|---|---|
| Apparatus: | Waters LCM1 |
| Detector: | Waters 410 |
| Eluent: | acetonitrile/water = 40/60 Vol %, pH 6.0<br>flow rate: 0.6 ml/min |
| Columns: | sort: TSK-GEL G4000SWXL + G3000SWXL + G2000SWXL + GUARD COLUMN produced by TOSOH Corporation 7.8 × 300 mm, 6.0 × 40 mm, respectively |
| Calibration curve: | standardized by polyethylene glycols |

Measuring Method for the Polymerization Ratio of the Respective Monomers

The residual amounts of the monomers were measured with liquid chromatography under a condition as mentioned below, and the polymerization ratio was calculated.

| | |
|---|---|
| Apparatus: | HSS-900 HPLC supervisor system produced by Nippon Bunko Co., Ltd. |
| Detector: | L-4000H (UV), 254 nm (for analyzing acrylic acid) produced by Toshiba Corporation; and L-3350 (RI) (for analyzing an unsaturated alcohol as obtained by adding ethylene oxide to 3-methyl-3-buten-1-ol) produced by Toshiba Corporation |
| Eluent: | 0.1 vol % aqueous phosphoric acid solution/acetonitrile = 50/50 Vol %, |
| Columns: | sort: ODS120T + ODS80Ts (4.6 mm I.D. 25 cm respectively) produced by TOSOH Corporation |
| Calibration curve: | external standardization method |

Example 1-1 for Producing Copolymer (1) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 65° C. Thereto, 0.38 parts of aqueous hydrogen peroxide solution of 30% was added, and then 19.83 parts of aqueous acrylic acid solution of 40%, 0.35 parts of 3-mercaptopropionic acid, and 6.99 parts of aqueous L-ascorbic acid solution of 2.1% were dropwise added over periods of 3 hours, 3 hours, 3.5 hours respectively. Thereafter, the temperature was subsequently kept at 65° C. for 60 minutes to complete a polymerization reaction, and then the resultant reaction mixture was cooled to not higher than 50° C. and then neutralized with 79.12 parts of aqueous sodium hydroxide solution of 5.0% to adjust from pH 4 to pH 7, thus obtaining a copolymer (1) according to the present invention for cement admixtures comprising an aqueous solution of a copolymer with a weight-average molecular weight of 27,000. Incidentally, the ratio of the entire monomers to the entire raw materials, as used for the polymerization, was 59.7 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 78.4% and the polymerization ratio of acrylic acid was 98.4%.

The results of analyses of the resultant copolymer (1) for cement admixtures are as follows:

$^1$H-NMR: as is shown in FIG. 1, signal tops were verified at 2.04 ppm, 1.40 ppm, and 0.75 ppm, and further, a signal derived from polyethylene glycol (hereinafter abbreviated as PEG) was verified in the range of 3.3 to 3.8 ppm.

Figure 2:
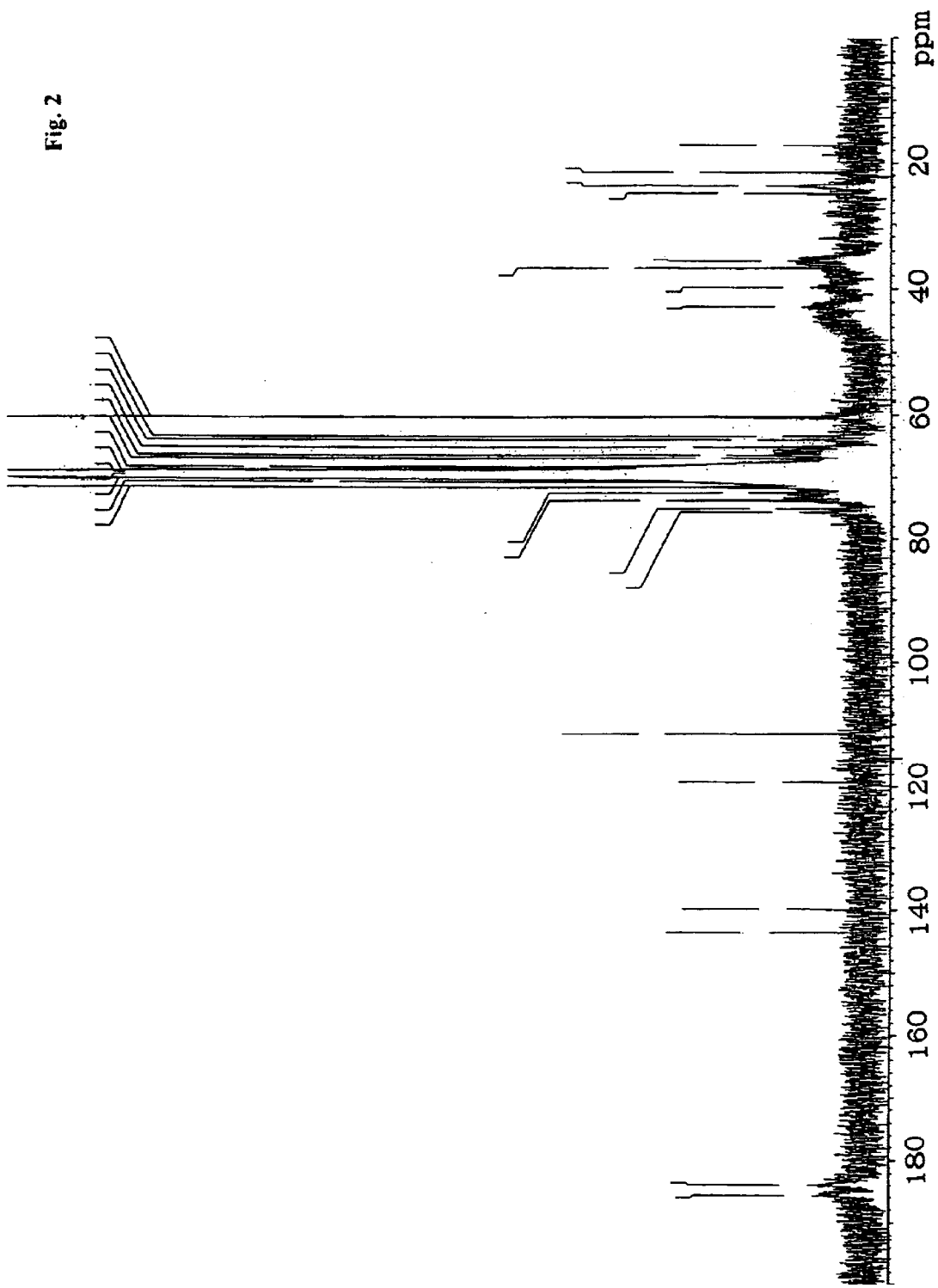
FIG. 2 is a $^{13}$C-NMR spectral chart of copolymer (1) according to the present invention for cement admixtures.

$^{13}$C-NMR (measuring method A): as is shown in FIG. 2, signal tops were verified at 44.5 ppm, 42.8 ppm, 36.8 ppm, 35.7 ppm, and 23.8 ppm, and further, a signal derived from PEG was verified in the range of 60.0 to 80.0 ppm, and a signal derived from terminal methyl of PEG was verified at 60.3 ppm.

Spin-spin relaxation time ($T_2$): the spin-spin relaxation time ($T_2$) was 42.2 msec at 2.04 ppm, and 15.6 msec at 1.40 ppm.

Example 1-2 for Producing Copolymer (2) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 65° C. Thereto, 0.57 parts of aqueous hydrogen peroxide solution of 30% was added, and then 34.94 parts of aqueous acrylic acid solution of 40%, 0.53 parts of 3-mercaptopropionic acid, and 10.52 parts of aqueous L-ascorbic acid solution of 2.1% were dropwise added over periods of 3 hours, 3 hours, 3.5 hours respectively. Thereafter, the temperature was subsequently kept at 65° C. for 60 minutes to complete a polymerization reaction, and then the resultant reaction mixture was cooled to not higher than 50° C. and then neutralized with 77.40 parts of aqueous sodium hydroxide solution of 9.0% to adjust from pH 4 to pH 7, thus obtaining a copolymer (2) according to the present invention for cement admixtures comprising an aqueous solution of a copolymer with a weight-average molecular weight of 28,000. Incidentally, the ratio of the entire monomers to the entire raw materials, as used for the polymerization, was 57.6 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 90.1% and the polymerization ratio of acrylic acid was 99.0%.

Example 1-3 for Producing Copolymer (3) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 65° C. Thereto, 0.71 parts of aqueous hydrogen peroxide solution of 30% was added, and then 46.58 parts of aqueous acrylic acid solution of 40%, 0.67 parts of 3-mercaptopropionic acid, and 12.97 parts of aqueous L-ascorbic acid solution of 2.1% were dropwise added over periods of 3 hours, 3 hours, 3.5 hours respectively. Thereafter, the temperature was subsequently kept at 65° C. for 60 minutes to complete a polymerization reaction, and then the resultant reaction mixture was cooled to not higher than 50° C. and then neutralized with 76.07 parts of aqueous sodium hydroxide solution of 12.2% to adjust from pH 4 to pH 7, thus obtaining a copolymer (3) according to the present invention for cement admixtures comprising an aqueous solution of a copolymer with a weight-average molecular weight of 29,000. Incidentally, the ratio of the entire monomers to the entire raw materials, as used for the polymerization, was 56.2 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 94.0% and the polymerization ratio of acrylic acid was 97.8%.

Figure 3:
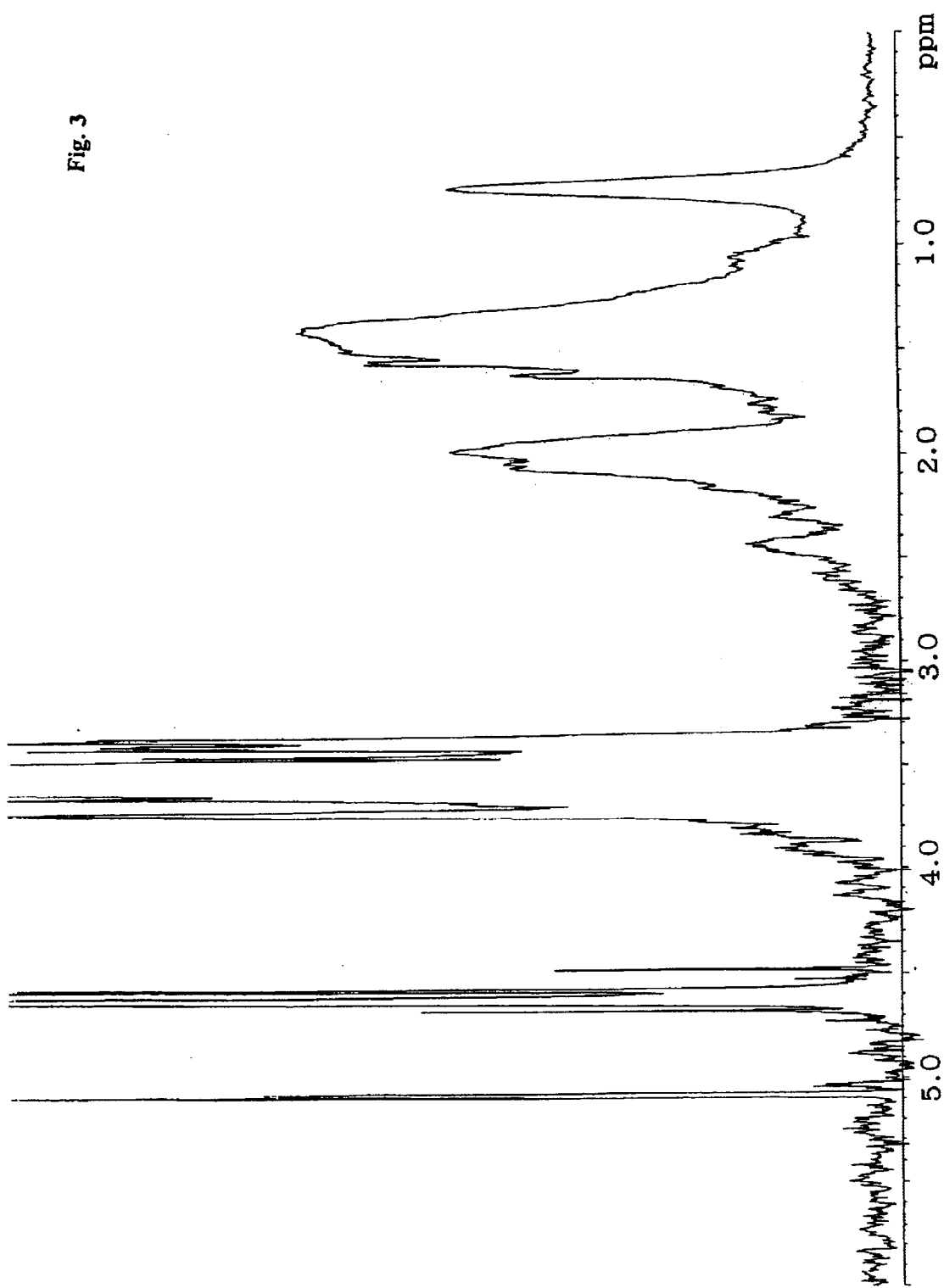
FIG. 3 is a $^1$H-NMR spectral chart of copolymer (3) according to the present invention for cement admixtures.

The results of analyses of the resultant copolymer (3) for cement admixtures are as follows:

$^1$H-NMR: as is shown in FIG. 3, signal tops were verified at 2.04 ppm, 1.43 ppm, and 0.72 ppm, and further, a signal derived from PEG was verified in the range of 3.3 to 3.8 ppm.

Figure 4:
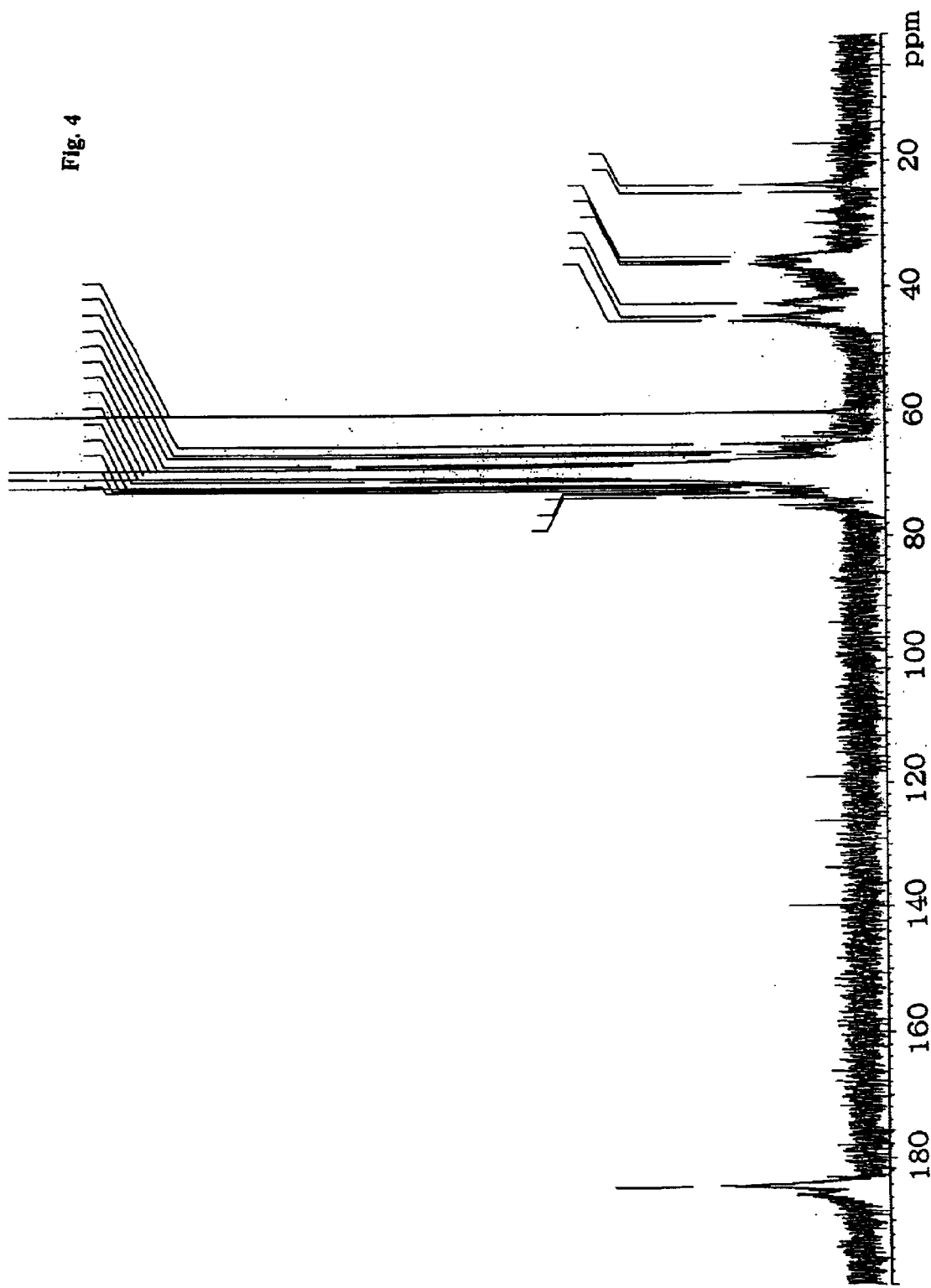
FIG. 4 is a $^{13}$C-NMR spectral chart of copolymer (3) according to the present invention for cement admixtures.

$^{13}$C-NMR (measuring method A): as is shown in FIG. 4, signal tops were verified at 45.4 ppm, 42.7 ppm, 36.3 ppm, 35.3 ppm, and 23.7 ppm, and further, a signal derived from PEG was verified in the range of 65.0 to 76.0 ppm, and a signal derived from terminal methyl of PEG was verified at 60.3 ppm.

Spin-spin relaxation time ($T_2$): the spin-spin relaxation time ($T_2$) was 86.3 msec at 2.04 ppm, and 39.3 msec at 1.43 ppm.

Example 1-4 for Producing Copolymer (4) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 25 mols of ethylene oxide to 3-methyl-3-buten-1-ol), and then they were heated to 60° C. Thereto, 0.90 parts of aqueous hydrogen peroxide solution of 30% was added, and then 20.75 parts of acrylic acid and an aqueous solution which was a mixture of 1.05 parts of 3-mercaptopropionic acid, 0.35 parts of L-ascorbic acid and 16.32 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 104.08 parts of aqueous sodium hydroxide solution of 10.0% to adjust from pH 4 to pH 7, thus obtaining a copolymer (4) according to the present invention for cement admixtures comprising an aqueous solution of a copolymer with a weight-average molecular weight of 20,000. Incidentally, the ratio of the entire monomers to the entire raw materials, as used for the polymerization, was 62.0 weight %. In addition, the residual amounts of the unsaturated alcohol as obtained by adding 25 moles of ethylene oxide to 3-methyl-3-buten-1-ol and acrylic acid were measured with liquid chromatography (LC) and the polymerization ratio was calculated. The polymerization ratio of the unsaturated alcohol was 88.0% and the polymerization ratio of acrylic acid was 99.6%.

Example 1-5 for Producing Copolymer (5) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 75 mols of ethylene oxide to 3-methyl-3-buten-1-ol), and then they were heated to 60° C. Thereto, 0.85 parts of aqueous hydrogen peroxide solution of 30% was added, and then 24.46 parts of acrylic acid and an aqueous solution which was a mixture of 0.80 parts of 3-mercaptopropionic acid, 0.33 parts of L-ascorbic acid and 32.88 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 94.59 parts of aqueous sodium hydroxide solution of 12.9% to adjust from pH 4 to pH 7, thus obtaining a copolymer (5) according to the present invention for cement admixtures comprising an aqueous solution of a copolymer with a weight-average molecular weight of 33,000. Incidentally, the ratio of the entire monomers to the entire raw materials, as used for the polymerization, was 58.7 weight %. In addition, the residual amounts of the unsaturated alcohol as obtained by adding 75 moles of ethylene oxide to 3-methyl-3-buten-1-ol and acrylic acid were measured with liquid chromatography (LC) and the polymerization ratio was calculated. The polymerization ratio of the unsaturated alcohol was 95.7% and the polymerization ratio of acrylic acid was 99.2%.

Figure 5:
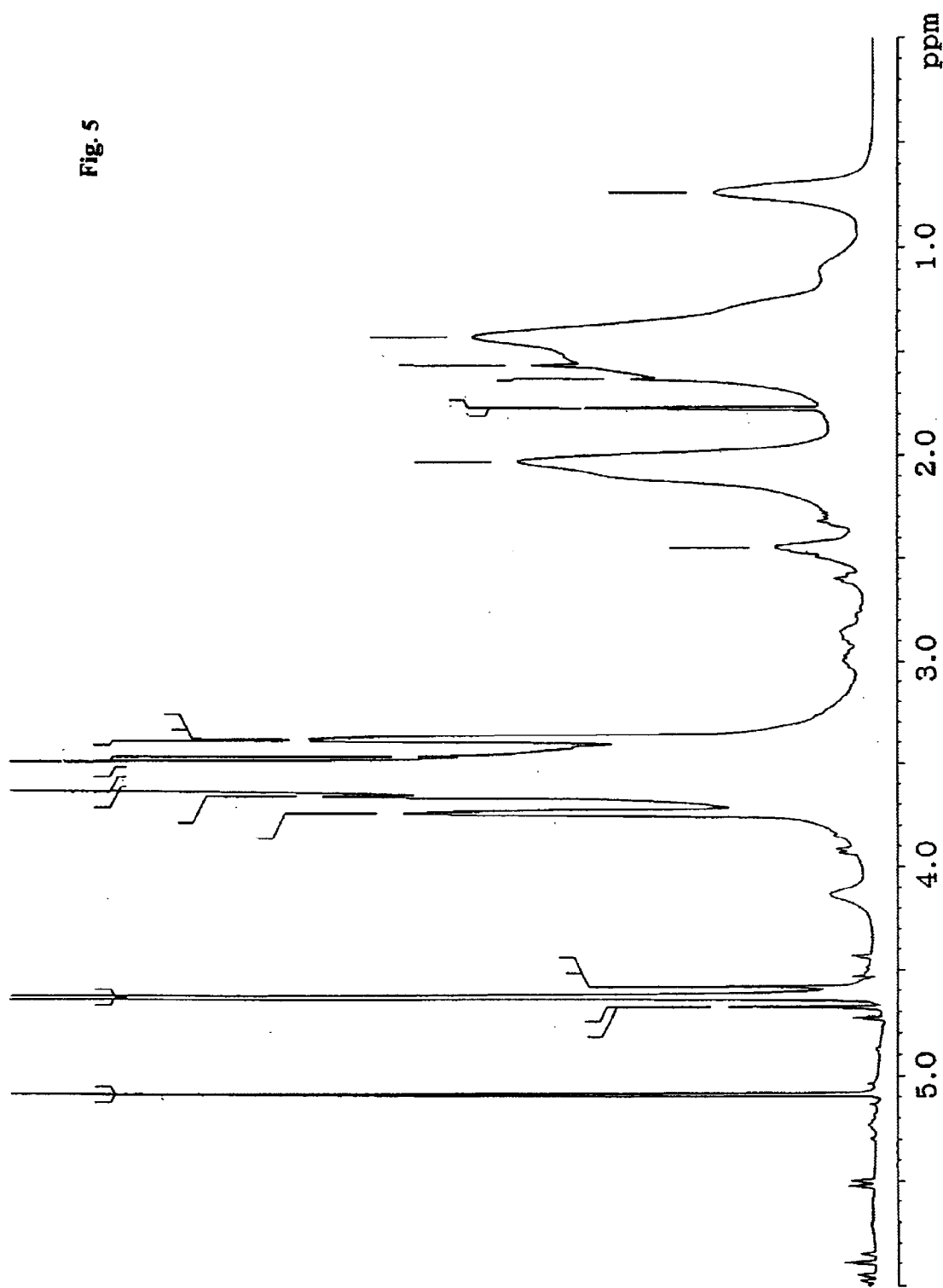
FIG. 5 is a $^1$H-NMR spectral chart of copolymer (5) according to the present invention for cement admixtures.

The results of analyses of the resultant copolymer (5) for cement admixtures are as follows:

$^1$H-NMR: as is shown in FIG. 5, signal tops were verified at 2.03 ppm, 1.43 ppm, and 0.74 ppm, and further, a signal derived from PEG was verified in the range of 3.3 to 3.8 ppm.

Figure 6:
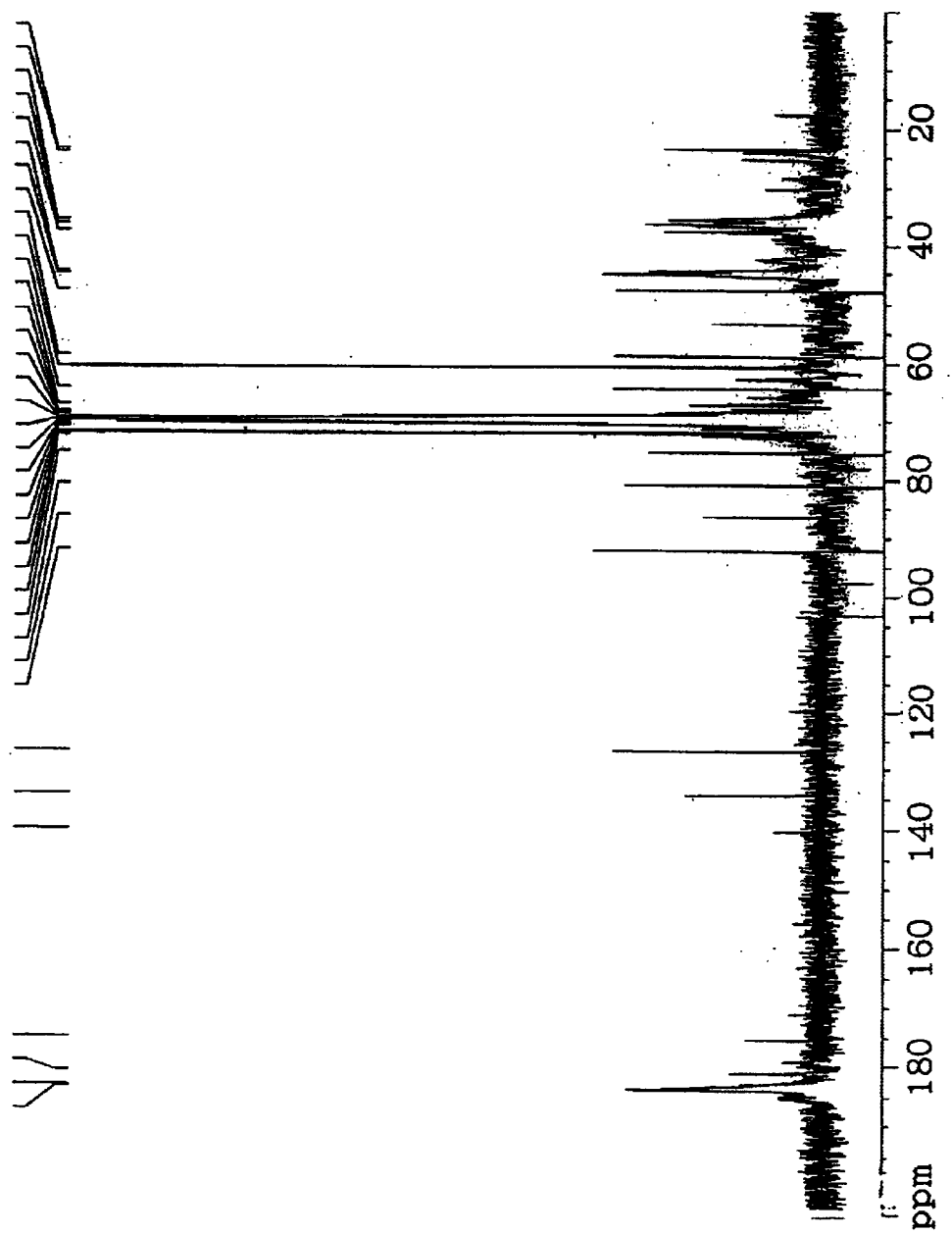
FIG. 6 is a $^{13}$C-NMR spectral chart of copolymer (5) according to the present invention for cement admixtures.

$^{13}$C-NMR (measuring method B): as is shown in FIG. 6, signal tops were verified at 45.2 ppm, 42.5 ppm, 36.6 ppm, 35.9 ppm, and 23.6 ppm, and further, a signal derived from PEG was verified in the range of 65.0 to 80.0 ppm, and a signal derived from terminal methyl of PEG was verified at 60.7 ppm.

Spin-spin relaxation time ($T_2$): the spin-spin relaxation time ($T_2$) was 83.0 msec at 2.03 ppm, and 28.4 msec at 1.43 ppm.

Example 1-6 for Producing Copolymer (6) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 100 mols of ethylene oxide to 3-methyl-3-buten-1-ol), and then they were heated to 60° C. Thereto, 0.31 parts of aqueous hydrogen peroxide solution of 30% was added, and then 7.93 parts of acrylic acid and an aqueous solution which was a mixture of 0.22 parts of 3-mercaptopropionic acid, 0.12 parts of L-ascorbic acid and 12.08 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 85.95 parts of aqueous sodium hydroxide solution of 4.6% to adjust from pH 4 to pH 7, thus obtaining a copolymer (6) according to the present invention for cement admixtures comprising an aqueous solution of a copolymer with a weight-average molecular weight of 51,000. Incidentally, the ratio of the entire monomers to the entire raw materials, as used for the polymerization, was 61.5 weight %. In addition, the residual amounts of the unsaturated alcohol as obtained by adding 100 moles of ethylene oxide to 3-methyl-3-buten-1-ol and acrylic acid were measured with liquid chromatography (LC) and the polymerization ratio was calculated. The polymerization ratio of the unsaturated alcohol was 89.1% and the polymerization ratio of acrylic acid was 98.5%.

Example 1-7 for Producing Copolymer (7) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 60° C. Thereto, 0.68 parts of aqueous hydrogen peroxide solution of 30% was added, and then a mixture of 8.82 parts of acrylic acid and 14.28 parts of hydroxyethyl acrylate and an aqueous solution which was a mixture of 0.96 parts of 3-mercaptopropionic acid, 0.27 parts of L-ascorbic acid and 26.63 parts of ion-exchanged water were dropwise added over periods of 3 hours, 3.5 hours respectively. Thereafter, the temperature was subsequently kept at 60° C. for 60 minutes to complete a polymerization reaction and then the resultant reaction mixture was cooled to not higher than 50° C. and then neutralized to with 89.19 parts of aqueous sodium hydroxide solution of 5.2% to adjust from pH 4 to pH 7, thus obtaining a copolymer (7) according to the present invention for cement admixtures comprising an aqueous solution of a copolymer with a weight-average molecular weight of 22,000. Incidentally, the ratio of the entire monomers to the entire raw materials, as used for the polymerization, was 64.0 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 90.9% and the polymerization ratio of acrylic acid was 99.0%.

Example 1-8 for Producing Copolymer (8) for Cement Admixtures

A glass reactor with a thermometer, a stirrer, a dropping funnel, and a reflux condenser was charged with 72.26 parts of ion-exchanged water, 127.74 parts of unsaturated alcohol (product by an addition reaction of 50 mols of ethylene oxide to 3-methyl-3-buten-1-ol) and 11.11 parts of maleic acid, and then they were heated to 60° C. Thereto, 0.56 parts of aqueous hydrogen peroxide solution of 30% was added, and then 6.9 parts of acrylic acid and an aqueous solution which was a mixture of 0.22 parts of L-ascorbic acid and 24.13 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 93.62 parts of aqueous sodium hydroxide solution of 12.4% to adjust from pH 2 to pH 7, thus obtaining a copolymer (8) according to the present invention for cement admixtures comprising an aqueous solution of a copolymer with a weight-average molecular weight of 35,000. Incidentally, the ratio of the entire monomers to the entire raw materials, as used for the polymerization, was 60.6 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 95.4% and the polymerization ratio of acrylic acid was 99.0%.

Example 1-9 for Producing Copolymer (9) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 60° C. Thereto, 0.78 parts of aqueous hydrogen peroxide solution of 30% was added, and then a mixture of 8.82 parts of acrylic acid and 14.28 parts of methyl acrylate and an aqueous solution which was a mixture of 0.73 parts of 3-mercaptopropionic acid, 0.30 parts of L-ascorbic acid and 28.60 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 89.19 parts of aqueous sodium hydroxide solution of 5.2% to adjust from pH 4 to pH 7, thus obtaining a copolymer (9) according to the present invention for cement admixtures comprising an aqueous solution of a copolymer with a weight-average molecular weight of 29,000. Incidentally, the ratio of the entire monomers to the entire raw materials, as used for the polymerization, was 64.0 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 93.3% and the polymerization ratio of acrylic acid was 99.0%.

Example 1-10 for Producing Copolymer (10) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 15 mols of ethylene oxide to 3-methyl-3-buten-1-ol), and then they were heated to 60° C. Thereto, 0.83 parts of aqueous hydrogen peroxide solution of 30% was added, and then 13.98 parts of acrylic acid and an aqueous solution which was a mixture of 0.39 parts of 3-mercaptopropionic acid, 0.32 parts of L-ascorbic acid and 15.38 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 93.61 parts of aqueous sodium hydroxide solution of 7.5% to adjust from pH 4 to pH 7, thus obtaining a copolymer (10) according to the present invention for cement admixtures comprising an aqueous solution of a copolymer with a weight-average molecular weight of 19,000. Incidentally, the ratio of the entire monomers to the entire raw materials, as used for the polymerization, was 61.5 weight %. In addition, the residual amounts of the unsaturated alcohol as obtained by adding 15 moles of ethylene oxide to 3-methyl-3-buten-1-ol and acrylic acid were measured with liquid chromatography (LC) and the polymerization ratio was calculated. The polymerization ratio of the unsaturated alcohol was 67.6% and the polymerization ratio of acrylic acid was 100.0%.

Figure 7:
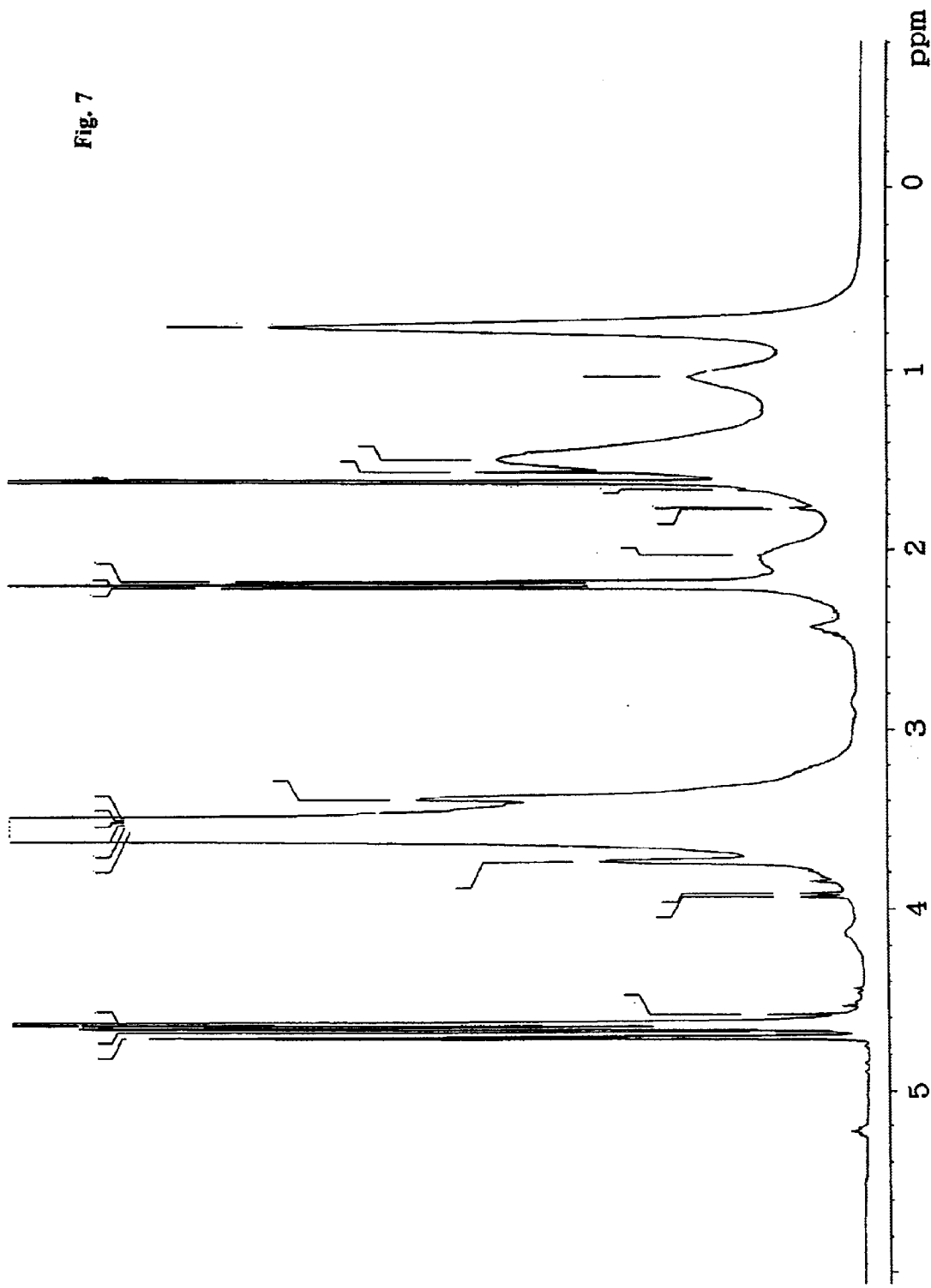
FIG. 7 is a $^1$H-NMR spectral chart of copolymer (10) according to the present invention for cement admixtures.

The results of analyses of the resultant copolymer (10) for cement admixtures are as follows:

$^1$H-NMR: as is shown in FIG. 7, signal tops were verified at 2.03 ppm, 1.50 ppm, and 0.77 ppm, and further, a signal derived from PEG was verified in the range of 3.2 to 3.6 ppm.

Figure 8:
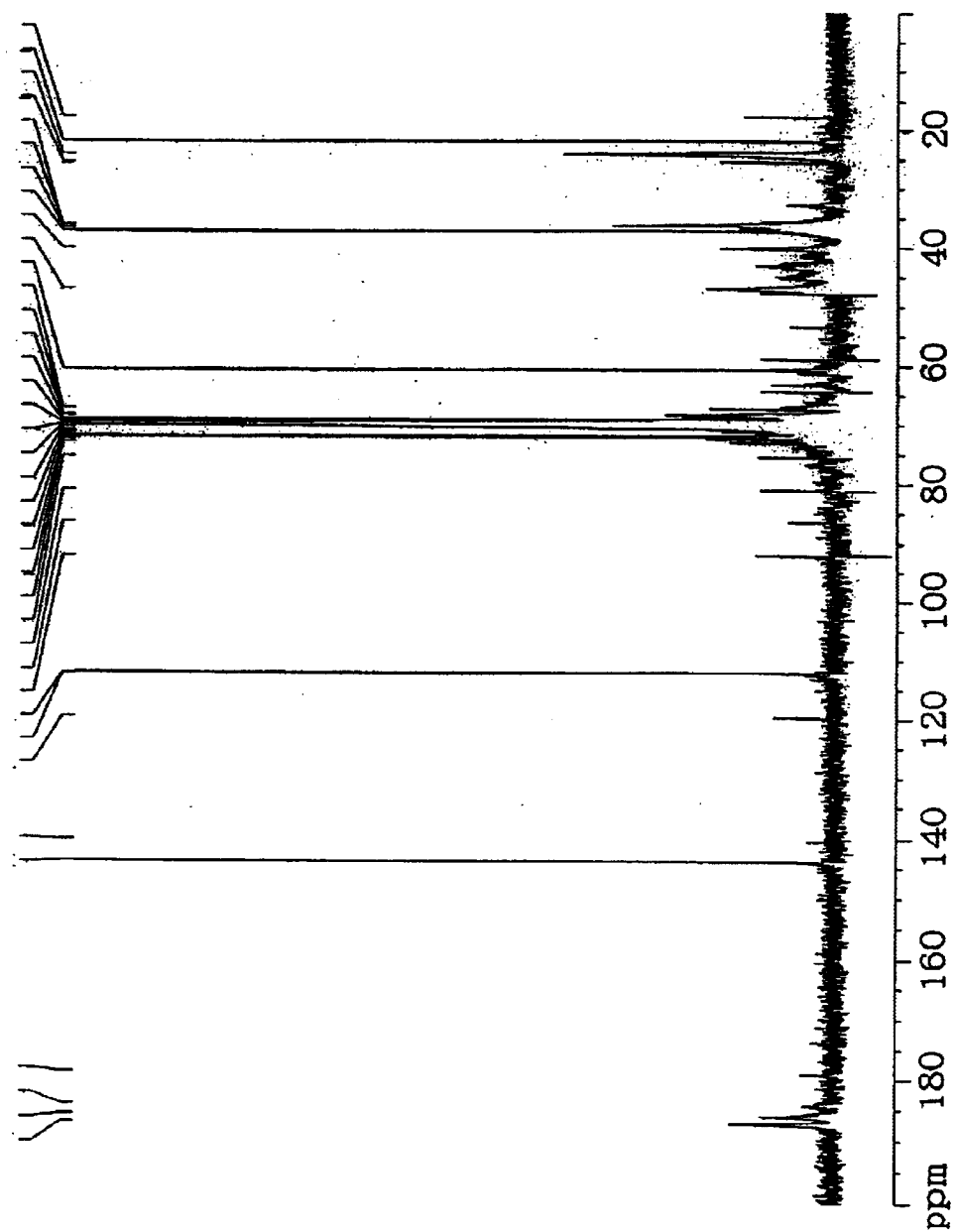
FIG. 8 is a $^{13}$C-NMR spectral chart of copolymer (10) according to the present invention for cement admixtures.

$^{13}$C-NMR (measuring method B): as is shown in FIG. 8, signal tops were verified at 47.2 ppm, 42.0 ppm, 36.3 ppm, 35.5 ppm, and 24.2 ppm, and further, a signal derived from PEG was verified in the range of 65.0 to 80.0 ppm, and a signal derived from terminal methyl of PEG was verified at 60.7 ppm.

Spin-spin relaxation time ($T_2$): the spin-spin relaxation time ($T_2$) was 20.3 msec at 2.03 ppm, and 9.8 msec at 1.50 ppm.

Example 1-11 for Producing Copolymer (11) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 60° C. Thereto, 1.15 parts of aqueous hydrogen peroxide solution of 30% was added, and then 32.61 parts of acrylic acid and an aqueous solution which was a mixture of 0.97 parts of 3-mercaptopropionic acid, 0.45 parts of L-ascorbic acid and 20.97 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 121.11 parts of aqueous sodium hydroxide solution of 13.5% to adjust from pH 4 to pH 7, thus obtaining a copolymer (11) according to the present invention for cement admixtures comprising an aqueous solution of a copolymer with a weight-average molecular weight of 27,000. Incidentally, the ratio of the entire monomers to the entire raw materials, as used for the polymerization, was 62.6 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 95.6% and the polymerization ratio of acrylic acid was 100.0%.

Figure 9:
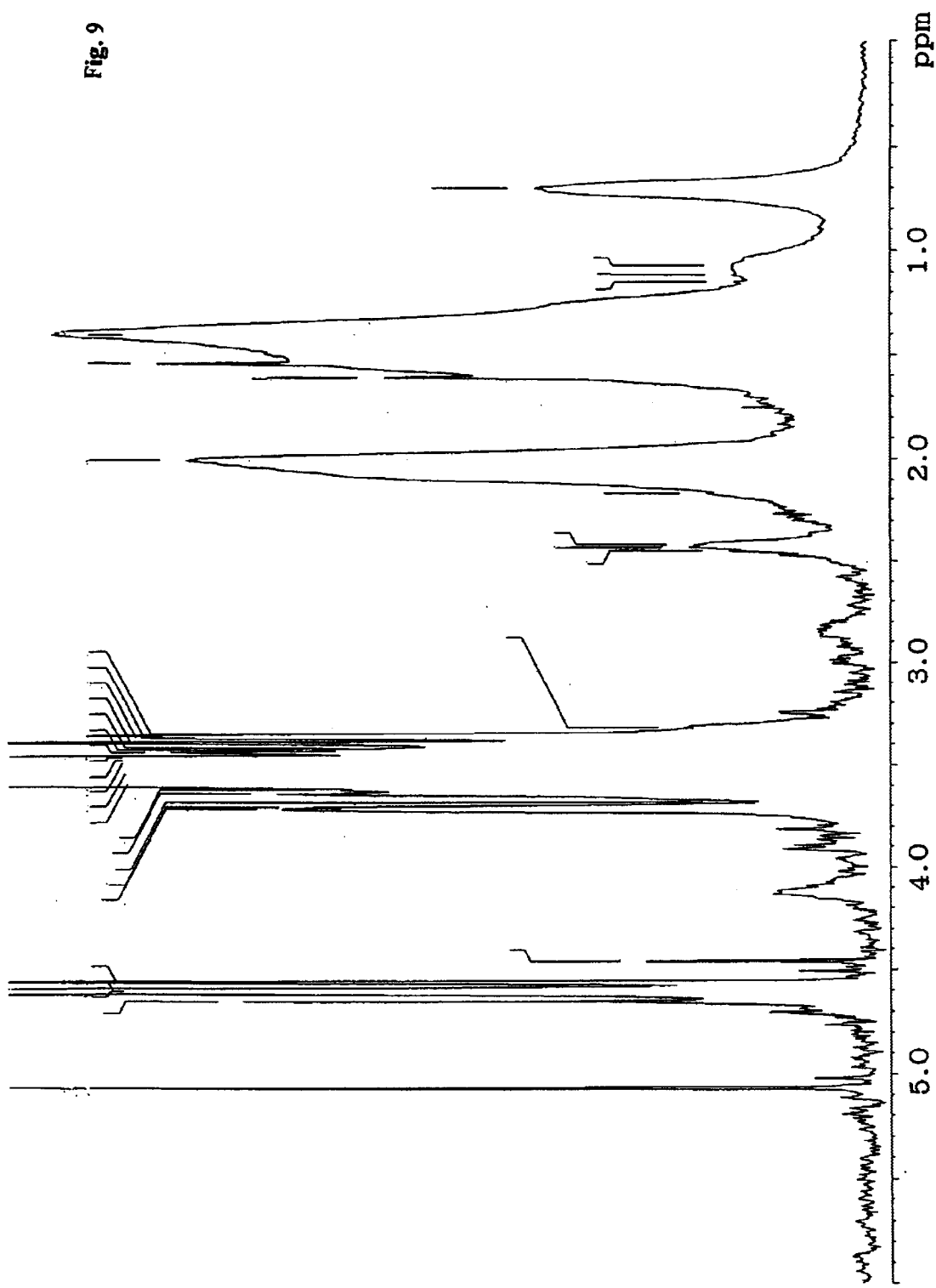
FIG. 9 is a $^1$H-NMR spectral chart of copolymer (11) according to the present invention for cement admixtures.

The results of analyses of the resultant copolymer (11) for cement admixtures are as follows:

$^1$H-NMR: as is shown in FIG. 9, signal tops were verified at 2.01 ppm, 1.41 ppm, and 0.70 ppm, and further, a signal derived from PEG was verified in the range of 3.3 to 3.8 ppm.

Figure 10:
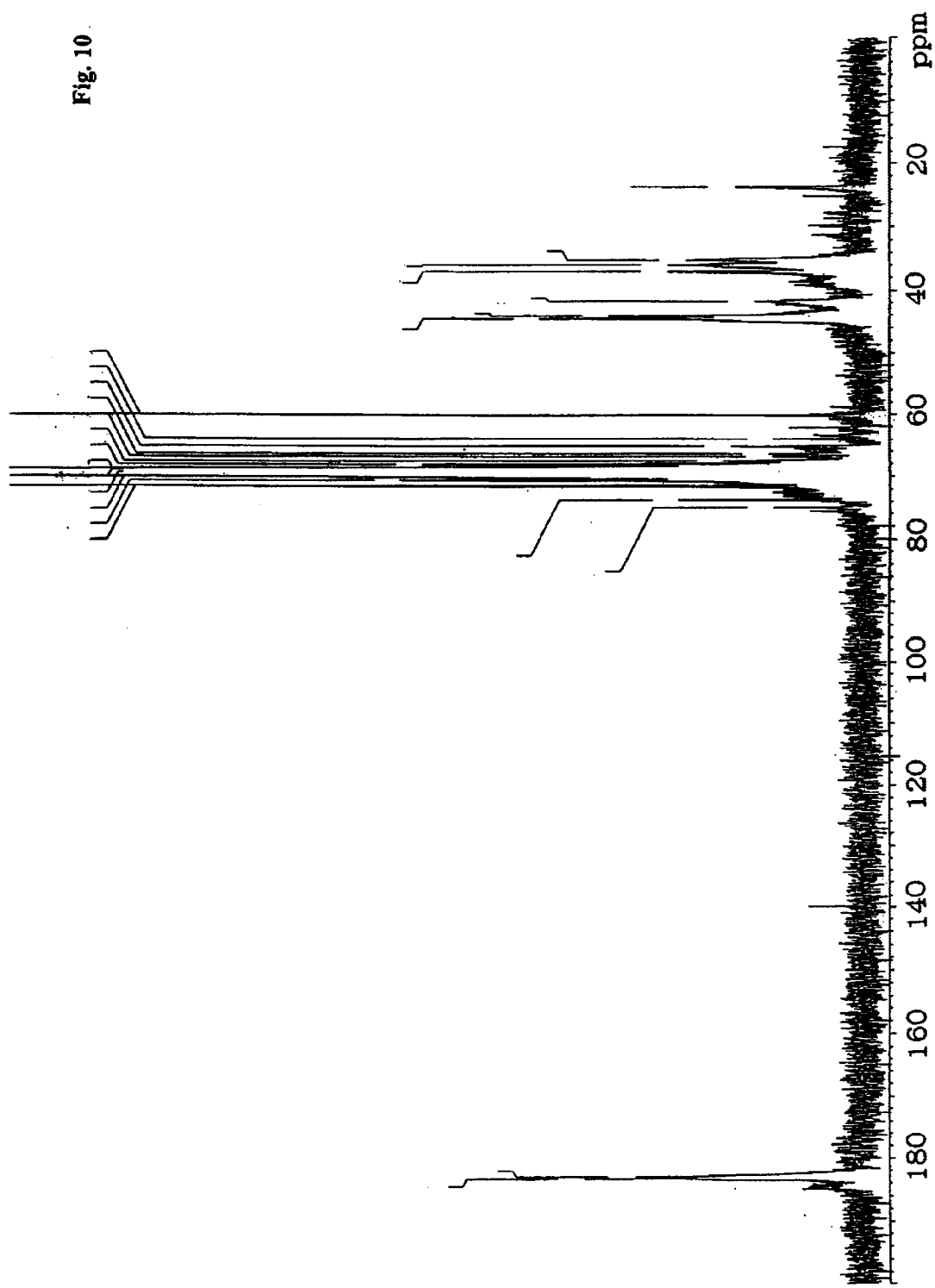
FIG. 10 is a $^{13}$C-NMR spectral chart of copolymer (11) according to the present invention for cement admixtures.

$^{13}$C-NMR (measuring method A): as is shown in FIG. 10, signal tops were verified at 44.8 ppm, 41.9 ppm, 36.2 ppm, 35.5 ppm, and 23.8 ppm, and further, a signal derived from PEG was verified in the range of 64.0 to 78.0 ppm, and a signal derived from terminal methyl of PEG was verified at 60.3 ppm.

Spin-spin relaxation time ($T_2$): the spin-spin relaxation time ($T_2$) was 68.8 msec at 2.01 ppm, and 18.5 msec at 1.41 ppm.

Example 1-12 for Producing Copolymer (12) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 60° C. Thereto, 0.80 parts of aqueous hydrogen peroxide solution of 30% was added, and then an aqueous solution which was a mixture of 18.70 parts of acrylic acid, 6.11 parts of sodium methallylsulfononate and 20.19 parts of ion-exchanged water, and an aqueous solution which was a mixture of 0.31 parts of L-ascorbic acid and 17.27 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 87.52 parts of aqueous sodium hydroxide solution of 12.0% to adjust from pH 4 to pH 7, thus obtaining a copolymer (12) according to the present invention for cement admixtures comprising an aqueous solution of a copolymer with a weight-average molecular weight of 21,400. Incidentally, the ratio of the entire monomers to the entire raw materials, as used for the polymerization, was 58.0 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 95.1% and the polymerization ratio of acrylic acid was 98.2%.

Example 1-13 for Producing Copolymer (13) for Cement Admixtures

A glass reactor with a thermometer, a stirrer, a dropping funnel, and a reflux condenser was charged with 72.26 parts of ion-exchanged water and 127.74 parts of unsaturated alcohol (product by an addition reaction of 50 mols of ethylene oxide to 3-methyl-3-buten-1-ol), and then they were heated to 60° C. Thereto, 0.71 parts of aqueous hydrogen peroxide solution of 30% was added, and then 18.63 parts of acrylic acid and an aqueous solution which was a mixture of 1.46 parts of hypophosphorous acid, 0.28 parts of L-ascorbic acid and 12.97 parts of ion-exchanged water were dropwise added over periods of 3 hours, 3.5 hours respectively. Thereafter, the temperature was subsequently kept at 60° C. for 60 minutes to complete a polymerization reaction, and then the resultant reaction mixture was cooled to not higher than 50° C. and then neutralized with 104.02 parts of aqueous sodium hydroxide solution of 8.9% to adjust from pH 4 to pH 7, thus obtaining a copolymer (13) according to the present invention for cement admixtures comprising an aqueous solution of a copolymer with a weight-average molecular weight of 41,600. Incidentally, the ratio of the entire monomers to the entire raw materials, as used for the polymerization, was 62.8 weight %. In addition, the residual amounts of the unsaturated alcohol as obtained by adding 50 moles of ethylene oxide to 3-methyl-3-buten-1-ol and acrylic acid were measured with liquid chromatography (LC) and the polymerization ratio was calculated. The polymerization ratio of the unsaturated alcohol was 94.3% and the polymerization ratio of acrylic acid was 97.3%.

Comparative Example 1-1 for Producing Comparative Copolymer (1) for Cement Admixtures A glass reactor with a thermometer, a stirrer, a dropping funnel, and a reflux condenser was charged with 451 parts of ion-exchanged water, and then this ion-exchanged water was heated to 75° C. Thereto, 195 parts of aqueous ammonium acrylate solution of 40%, 33 parts of aqueous acrylic acid solution of 80%, 191 parts of aqueous unsaturated alcohol (product by an addition reaction of 5 mols of ethylene oxide to 3-methyl-3-buten-1-ol) solution of 50%, 130 parts of aqueous ammonium persulfate solution of 3% were dropwise added from separate dropping nozzles respectively under stirred conditions. Incidentally, the dropwise addition periods of time were 150 minutes for the aqueous ammonium persulfate solution and 120 minutes for the others. After the dropwise addition of the aqueous ammonium persulfate solution had been completed, the copolymerization reaction was continued at 100° C. for 30 minutes, and then the resultant reaction mixture was cooled and then neutralized by adding thereto 20 parts of aqueous ammonia solution of 28%; thus obtaining a comparative copolymer (1) for cement admixtures comprising an aqueous solution of a copolymer with a weight-average molecular weight of 23,000. Incidentally, the ratio of the entire monomers to the entire raw materials, as used for the polymerization, was 20 weight %.

Comparative Example 1-2

Figure 11:
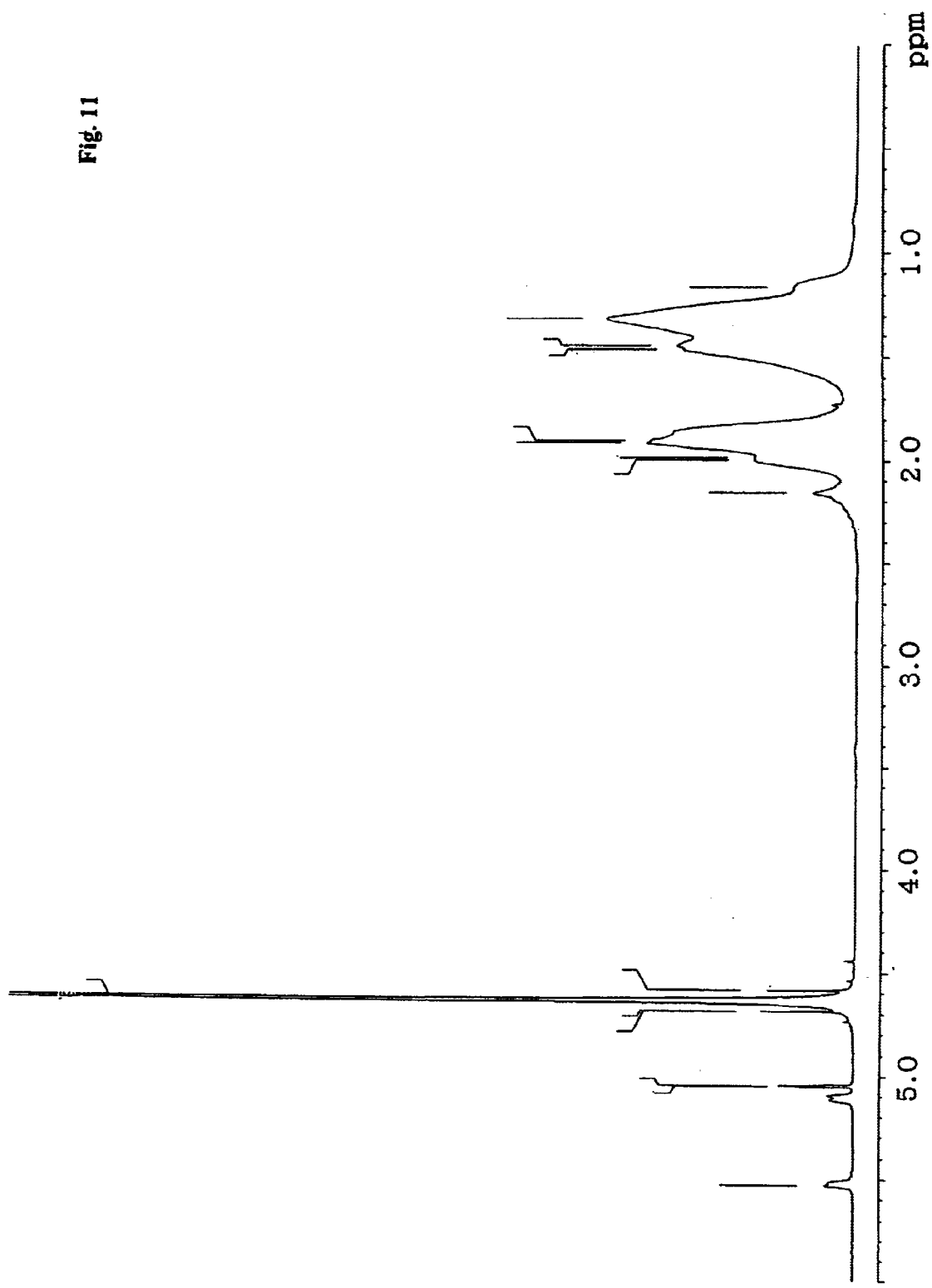
FIG. 11 is a $^1$H-NMR spectral chart of poly(sodium acrylate).

Poly(sodium acrylate) (weight-average molecular weight=10,000) was analyzed in the same way as of Example 1-1. The results are as follows:

$^1$H-NMR: as is shown in FIG. 11, signal tops were verified at 2.00 ppm, 1.92 ppm, 1.45 ppm, and 1.32 ppm, but no signal derived from PEG was verified in the range of 3.2 to 3.8 ppm.

Figure 12:
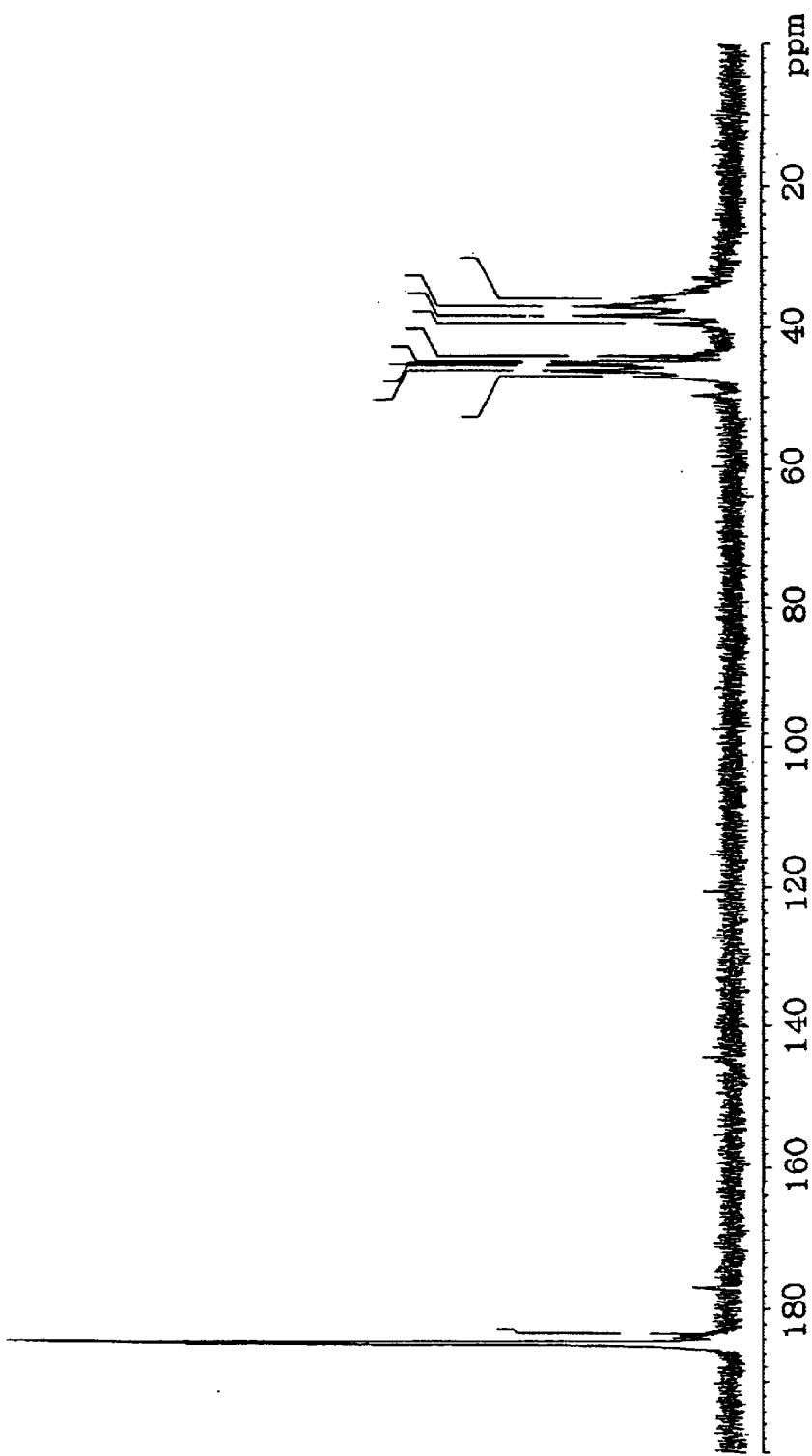
FIG. 12 is a $^{13}$C-NMR spectral chart of poly(sodium acrylate).

$^{13}$C-NMR (measuring method B): as is shown in FIG. 12, signal tops were verified at 46.2 ppm and 37.0 ppm, but neither the signal derived from PEG nor the signal derived from terminal methyl of PEG was verified.

Spin-spin relaxation time ($T_2$): the spin-spin relaxation time ($T_2$) was 123.8 msec at 1.92 ppm, and 53.4 msec at 1.32 ppm.

Examples 2-1 to 2-11, Examples 3-1 to 3-3 and Comparative Examples 2-1 and 3-1

The below-mentioned concrete test was carried out using the aqueous copolymer solutions of the copolymers (1) to (9), (12) and (13) according to the present invention for cement admixtures and the aqueous copolymer solution of the comparative copolymer (1) for cement admixtures.

Concrete Test

The following materials were used: normal portland cement (produced by Pacific Cement Co., Ltd.; specific gravity=3.16) as cement; a sand blend (specific gravity=2.62, FM=2.71) of land sand from Ohi River System, Japan and mountain sand from Kisarazu, Japan as a fine aggregate; and crushed stone of hard sandstone from Oume, Japan (specific gravity=2.64, MS=20 mm) as a coarse aggregate.

Concrete was produced in a mixing and kneading amount of 30 liters by normal combinations in Examples 2-1 to 2-11 and Comparative Example 2-1 and in a mixing and kneading amount of 50 liters by high strong combinations in Examples 3-1 to 3-3 and Comparative Example 3-1 under the above conditions, and then measured by the slump value, the flow value, and the air quantity. Incidentally, a forcible kneading mixer was used for mixing and kneading the concrete, and the mixing and kneading periods of time were 2 minutes for the normal combinations and 3 minutes for the high strong combinations, and the measurement of the slump value, the flow value, and the air quantity was carried out in accordance with the Japanese Industrial Standard (JIS-A-1101 and 1128).

The combinations and compositions of the concrete are shown in Table 1, and the test results of the normal combinations in Examples 2-1 to 2-11 and Comparative Example 2-1 are shown in Table 2, and the test results of the high strong combinations in Examples 3-1 to 3-3 and Comparative Example 3-1 are shown in Table 3. Incidentally, the amount of addition of each copolymer for cement admixtures, shown in each table, is weight % in terms of solid content based on cement, and the comparisons were made in such an amount of addition as to give a slump value of 18 cm to the normal combinations and in such an amount of addition as to give a flow value of 600±50 mm to the high strong combinations. Incidentally, the mark "-" without numerical values of the slump value, the flow value, and the air quantity in Tables 2 and 3 means that no fluid uniform concrete was obtained and that the measurement was therefore impossible.

TABLE 1

| Combination | Combination for normal concrete | Combination for high strong concrete |
|---|---|---|
| Cement (kg) | 9.6 | 24.0 |
| Fine aggregate (kg) | 26.3 | 25.9 |
| Coarse aggregate (kg) | 26.9 | 35.4 |
| Water/cement ratio (%) | 54.0 | 30.0 |

TABLE 2

| | Name of copolymer for cement admixtures | Weight ratio of monomers | | | | Molar ratio of constitutional units | | Amount of addition of copolymer* | Slump value | Flow value | Air quantity |
|---|---|---|---|---|---|---|---|---|---|---|---|
| | | N | IPN-N | AA | Other | IPN-N | AA | (wt %) | (cm) | (mm) | (vol %) |
| Example 2-1 | Copolymer (1) for cement admixtures | 50 | 94.2 | 5.8 | | 0.40 | 1.00 | 0.120 | 18.0 | 289 | 3.6 |
| Example 2-2 | Copolymer (2) for cement admixtures | 50 | 90.1 | 9.9 | | 0.26 | 1.00 | 0.115 | 18.0 | 240 | 3.3 |
| Example 2-3 | Copolymer (3) for cement admixtures | 50 | 87.3 | 12.7 | | 0.21 | 1.00 | 0.130 | 18.0 | 250 | 3.7 |
| Example 2-4 | Copolymer (4) for cement admixtures | 25 | 86.0 | 14.0 | | 0.33 | 1.00 | 0.135 | 18.5 | 290 | 3.6 |
| Example 2-5 | Copolymer (5) for cement admixtures | 75 | 83.9 | 16.1 | | 0.11 | 1.00 | 0.140 | 18.0 | 260 | 3.3 |
| Example 2-6 | Copolymer (6) for cement admixtures | 100 | 94.2 | 5.8 | | 0.23 | 1.00 | 0.135 | 18.0 | 266 | 3.5 |
| Example 2-7 | Copolymer (7) for cement admixtures | 50 | 84.7 | 5.8 | 9.5 (HEA) | 0.42 | 1.00 | 0.120 | 17.5 | 275 | 3.5 |
| Example 2-8 | Copolymer (8) for cement admixtures | 50 | 85.2 | 4.6 | 10.2 (MA) | 0.56 | 1.00 | 0.135 | 17.5 | 290 | 3.4 |
| Example 2-9 | Copolymer (9) for cement admixtures | 50 | 85.6 | 6.2 | 8.2 (AM) | 0.41 | 1.00 | 0.140 | 18.0 | 305 | 4.2 |
| Example 2-10 | Copolymer (12) for cement admixtures | 50 | 83.5 | 12.2 | 4.1 (MSNa) | 0.21 | 1.00 | 0.140 | 18.0 | 290 | 3.9 |
| Example 2-11 | Copolymer (13) for cement admixtures | 50 | 87.3 | 12.7 | | 0.21 | 1.00 | 0.135 | 17.5 | 285 | 3.7 |
| Comparative Example 2-1 | Comparative copolymer (1) for cement admixtures | 5 | 52.2 | 47.8 | | — | | 0.500 | — | — | — |

*weight % in terms of solid content based on cement
N: molar addition number of ethylene oxide
IPN-N: a compound produced by an addition reaction of N moles of ethylene oxide to 3-methyl-3-buten-1-ol,
AA: acrylic acid,
HEA: hydroxylethyl acrylate,
MA: maleic acid,
AM: methyl acrylate, and
MSNa: sodium methallylsulfonate

TABLE 3

| | Name of copolymer for cement admixtures | N | Weight ratio of monomers IPN-N | AA | Molar ratio of constitutional units IPN-N | AA | Amount of addition of copolymer* | Flow value (mm) | Air quantity (vol %) |
|---|---|---|---|---|---|---|---|---|---|
| Example 3-1 | Copolymer (1) for cement admixtures | 50 | 94.2 | 5.8 | 0.40 | 1.00 | 0.185 | 626 | 3.4 |
| Example 3-2 | Copolymer (2) for cement admixtures | 50 | 90.1 | 9.9 | 0.26 | 1.00 | 0.175 | 645 | 3.4 |
| Example 3-3 | Copolymer (3) for cement admixtures | 50 | 87.3 | 12.7 | 0.21 | 1.00 | 0.150 | 650 | 3.8 |
| Comparative Example 3-1 | Comparative copolymer (1) for cement admixtures | 5 | 52.2 | 47.8 | — | | 1.000 | — | — |

*weight % in terms of solid content based on cement
N: molar addition number of ethylene oxide
IPN-N: a compound produced by an addition reaction of N moles of ethylene oxide to 3-methyl-3-buten-1-ol, and
AA: acrylic acid From the test results of the normal combinations shown in Table 2, it would be understood that the comparative copolymer (1) for cement admixtures does not exhibit dispersibility sufficient to obtain fluid uniform concrete even if this copolymer is used in an amount of addition of at least 3 times as large as that of the copolymers according to the present invention for cement admixtures, and that, in comparison, any of the copolymers according to the present invention for cement admixtures exhibits good dispersibility.

Furthermore, from the test results of the high strong combinations shown in Table 3, it would be understood that the comparative copolymer (1) for cement admixtures does not exhibit dispersibility sufficient to obtain fluid uniform concrete even if this copolymer is used in an amount of addition of at least 5 times as large as that of the copolymers according to the present invention for cement admixtures, and that, in comparison, any of the copolymers according to the present invention for cement admixtures exhibits excellent dispersibility even under severe combination conditions where the water/cement ratio (W/C ratio) is small.

Examples 4-1 to 4-5 and Comparative Example 4-1

The copolymers (1), (3), (5), (10) and (11) according to the present invention for cement admixtures were compared with the poly(sodium acrylate) (weight-average molecular weight=10,000; aqueous solution) by the mortar flow value and the air quantity.

Mortar Test

The materials, as used for the test, and the combination for mortar are 600 g of Chichibu Onoda's normal portland cement, 600 g of Toyoura standard sand, and 210 g of ion-exchanged water containing each copolymer. Mortar was prepared by mechanical kneading at room temperature with a mortar mixer for 3 minutes, and then filled into a hollow cylinder of 55 mm in diameter and 55 mm in height. Next, after lifting the cylinder in perpendicular, the diameters of the mortar as spread on a table were measured in two directions, and the average value thereof was regarded as the mortar flow value. The results are shown in Table 4. Incidentally, the mark "-" without a numerical value of the air quantity in Table 4 means that no fluid uniform mortar was obtained and that the measurement was therefore impossible.

TABLE 4

| | Name of copolymer for cement admixtures | N | Weight ratio of monomers IPN-N | AA | Molar ratio of constitutional units IPN-N | AA | Amount of addition of copolymer* | Flow value (mm) | Air quantity (vol %) | Spin-spin relaxation time ($T_2$) A (msec)*1 | B (msec)*2 |
|---|---|---|---|---|---|---|---|---|---|---|---|
| Example 4-1 | Copolymer (1) for cement admixtures | 50 | 94.2 | 5.8 | 0.40 | 1.00 | 0.160 | 108 | 4.2 | 42.2 | 15.6 |
| Example 4-2 | Copolymer (3) for cement admixtures | 50 | 87.3 | 12.7 | 0.21 | 1.00 | 0.130 | 106 | 4.3 | 86.3 | 39.3 |
| Example 4-3 | Copolymer (5) for cement admixtures | 75 | 83.9 | 16.1 | 0.11 | 1.00 | 0.155 | 110 | 2.0 | 83.0 | 28.4 |
| Example 4-4 | Copolymer (10) for cement admixtures | 15 | 90.1 | 9.9 | 0.60 | 1.00 | 0.250 | 112 | 1.5 | 20.3 | 9.8 |
| Example 4-5 | Copolymer (11) for cement admixtures | 50 | 79.7 | 20.3 | 0.12 | 1.00 | 0.150 | 109 | 2.0 | 68.8 | 18.5 |

TABLE 4-continued

| Name of copolymer for cement admixtures | | Weight ratio of monomers | | Molar ratio of constitutional units | | Amount of addition of copolymer* | Flow value (mm) | Air quantity (vol %) | Spin-spin relaxation time (T$_2$) | |
|---|---|---|---|---|---|---|---|---|---|---|
| | N | IPN-N | AA | IPN-N | AA | | | | A (msec)*1 | B (msec)*2 |
| Comparative Example 4-1 | Poly(sodium acrylate) | — | 0 | 100 | — | | 0.500 | 56 | — | 123.8 | 53.4 |

*weight % in terms of solid content based on cement
*1spin-spin relaxation time (T$_2$) as to the signal observed at 1.8 to 2.4 ppm
*2spin-spin relaxation time (T$_2$) as to the signal observed at 1.2 to 1.8 ppm
N: molar addition number of ethylene oxide
IPN-N: a compound produced by an addition reaction of N moles of ethylene oxide to 3-methyl-3-buten-1-ol, and
AA: acrylic acid From the test results shown in Table 4, it would be understood that there is a correlation between the spin-spin relaxation time (T$_2$) and fluidity, and good fluidity is displayed if T$_2$ is in a constant range.

Examples 5-1 and 5-2

A case where a defoamer was added to the copolymer (1) according to the present invention for cement admixtures was compared with a case where the defoamer was not added to the copolymer (1) according to the present invention for cement admixtures in respect to changes of the mortar flow value and the air quantity with the passage of time.

Mortar Test

The materials, as used for the test, and the combination for mortar are 600 g of Chichibu Onoda's normal portland cement, 600 g of Toyoura standard sand, and 210 g of ion-exchanged water containing each copolymer. Furthermore, the oxyalkylene base defoaming agent (an adduct obtained by adding 5 mols of ethylene oxide and 35 mols of propylene oxide to hexanol) was added as the defoamer in an amount of 0.2 weight % of the copolymer for cement admixtures in order to adjust the air quantity.

Mortar was prepared by mechanical kneading at room temperature with a mortar mixer for 3 minutes, and then filled into a hollow cylinder of 55 mm in diameter and 55 mm in height. Next, immediately, 20 minutes, or 30 minutes after lifting the cylinder in perpendicular, the diameters of the mortar as spread on a table were measured in two directions, and the average value thereof was regarded as the mortar flow value. The results are shown in Table 5.

From the test results of the normal combinations shown in Table 5, it would be understood that the change of the quantity of entrained air with the passage of time can be rendered small by adding a defoamer.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement composition, which includes a copolymer for cement admixtures and cement as essential components, wherein the copolymer for cement admixtures comprises constitutional unit (I) derived from unsaturated polyalkylene glycol ether monomer (a) and constitutional unit (II) derived from unsaturated monocarboxylic acid monomer (b) as essential constitutional units,
    with the copolymer being characterized in that: (A) unsaturated polyalkylene glycol ether monomer (a) is a compound obtained by adding alkylene oxides to 3-methyl-3-buten-1-ol, having an oxyalkylene group having 2 to 18 carbon atoms with an average addition number of moles of the oxyalkylene groups to be in the range of 10 to 300, and (B) unsaturated monocarboxylic acid monomer (b) comprises acrylic acid and/or its salt as an essential component,
    wherein the copolymer may further include constitutional unit (III) derived from a copolymerizable monomer (c) with monomer (a) and/or monomer (b),
    wherein the ratio of (I)/(II)/(III) is in the range of 60–97/3–40/0–30 (weight %), and wherein the entirety of (I), (II) and (III) is 100 weight %.

TABLE 5

| Name of copolymer for cement admixtures | | Weight ratio of monomers | | Molar ratio of constitutional units | | Amount of addition of copolymer* | Amount of addition of defoamer* | Air quantity (vol %) (flow value (mm)) | | |
|---|---|---|---|---|---|---|---|---|---|---|
| | | | | | | | | Immediately after | 20 minutes after | 30 minutes after |
| | N | IPN-N | AA | IPN-N | AA | | | | | |
| Example 5-1 Copolymer (1) for cement admixtures | 50 | 94.2 | 5.8 | 0.40 | 1.00 | 0.110 | 0.0002 | 4.3 (166) | 3.3 (147) | 4.0 (132) |
| Example 5-2 Copolymer (1) for cement admixtures | 50 | 94.2 | 5.8 | 0.40 | 1.00 | 0.110 | 0 | 9.7 (175) | 6.7 (157) | 5.9 (136) |

*weight % in terms of solid content based on cement
IPN-N: a compound produced by an addition reaction of N moles of ethylene oxide to 3-methyl-3-buten-1-ol, and
AA: acrylic acid 2. A cement composition according to claim 1, wherein the copolymner further comprises a constitutional unit derived from an unsaturated dicarboxylic acid monomer.

3. A cement composition according to claim 1, wherein the ratio of constitutional unit (I) and constitutional unit (II) by mole is: constitutional unit(I)<constitutional unit (II).

4. A cement composition according to claim 1, wherein the copolymer is obtained by copolymerizing comonomers including unsaturated polyalkylene glycol ether monomer (a) and unsaturated monocarboxylic acid monomer (b), and the ratio of monomer (a) and monomer (b) by weight is: monomer (b)/(monomer(a)+monomer(b))×100≧5.8.

5. A cement composition according to claim 1, wherein the copolymer has a spin-spin relaxation time ($T_2$) of 1 msec to 50 msec as to a signal observed at 1.2 to 1.8 ppm with $^1$H-NMR and/or a spin-spin relaxation time ($T_2$) of 1 msec to 90 msec as to a signal observed at 1.8 to 2.4 ppm with $^1$H-NMR.

6. A cement composition, which includes a copolymer for cement admixtures and cement as essential components,
wherein the copolymer for cement admixtures has: a weight-average molecular weight of not less that 10,000; respective signals detected at the chemical shifts of 0.6 to 1.0 ppm, 1.2 to 1.8 ppm, 1.8 to 2.4 ppm and 3.2 to 3.8 ppm with $^1$H-NMR; respective signals detected at the chemical shifts of 20.0 to 30.0 ppm, 30.0 to 50.0 ppm, 58.0 to 62.0 ppm and 60.0 to 80.0 ppm with $^{13}$C-NMR; and a spin-spin relaxation time ($T_2$) of 1 msec to 50 msec as to the signal observed at 1.2 to 1.8 ppm with $^1$H-NNR and/or a spin-spin relaxation time ($T_2$) of 1 msec to 90 msec as to the signal observed at 1.8 to 2.4 ppm with $^1$H-NMR, and
unsaturated polyalkylene glycol ether monomer (a) having a 3-methyl-3-butenyl group coexists.

7. A cement composition according to claim 1, wherein the cement composition comprises said unsaturated polyalkylene glycol ether monomer (a) in the range of 0.01 to 40 weight % of the copolymer.

8. A cement composition according to claim 2, wherein the cement composition comprises said unsaturated polyalkylene glycol ether monomer (a) in the range of 0.01 to 40 weight % of the copolymer.

9. A cement composition according to claim 3, wherein the cement composition comprises said unsaturated polyalkylene glycol ether monomer (a) in the range of 0.01 to 40 weight % of the copolymer.

10. A cement composition according to claim 4, wherein the cement composition comprises said unsaturated polyalkylene glycol ether monomer (a) in the range of 0.01 to 40 weight % of the copolymer.

11. A cement composition according to claim 6, wherein the unsaturated polyalkylene glycol ether monomer (a) is a compound obtained by adding alkylene oxides to 3-methyl-3-buten-1-ol, having an oxyalkylene group having 2 to 18 carbon atoms with an average addition number of moles of the oxyalkylene groups to be in the range of 10 to 300.

* * * * *